US012776557B2

(12) United States Patent
Watanabe

(10) Patent No.: US 12,776,557 B2
(45) Date of Patent: Oct. 27, 2026

(54) HIGHER-ORDER MODE SUPPRESSOR, WAVEGUIDE FILTER DEVICE USING SAME, SPECTRUM ANALYZER, SIGNAL ANALYZER, SIGNAL GENERATION DEVICE, HIGHER-ORDER MODE SUPPRESSION CONTROL METHOD, AND FILTER CONFIGURATION METHOD

(71) Applicant: ANRITSU CORPORATION, Kanagawa (JP)

(72) Inventor: Kenichi Watanabe, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 97 days.

(21) Appl. No.: 18/946,247

(22) Filed: Nov. 13, 2024

(65) Prior Publication Data

US 2025/0192407 A1 Jun. 12, 2025

(30) Foreign Application Priority Data

Dec. 12, 2023 (JP) ................................ 2023-209578

(51) Int. Cl.
*H01P 1/16* (2006.01)
*H01P 1/212* (2006.01)
*H04B 17/318* (2015.01)

(52) U.S. Cl.
CPC ................ *H01P 1/16* (2013.01); *H01P 1/212* (2013.01); *H04B 17/318* (2015.01)

(58) Field of Classification Search
CPC .......... H01P 1/16; H01P 1/212; H04B 17/318
See application file for complete search history.

(56) References Cited

U.S. PATENT DOCUMENTS 2,546,840 A * 3/1951 Tyrrell .................... H01P 1/173 333/159
3,271,706 A * 9/1966 Rooney ................... H01P 1/211 333/210
7,746,190 B2 * 6/2010 Vanin ...................... H01P 1/208 333/125

(Continued)

FOREIGN PATENT DOCUMENTS

JP H07154101 A * 6/1995
JP 2020-137031 A 8/2020
RU 2517937 C2 * 6/2014 ......... B60C 15/0027

*Primary Examiner* — Quan Tra
(74) *Attorney, Agent, or Firm* — McDonald Hopkins LLC

(57) ABSTRACT

Provided are a higher-order mode suppressor, a waveguide filter device using the same, a spectrum analyzer, a signal analyzer, a signal generation device, a higher-order mode suppression control method, and a filter configuration method, which can reliably prevent a passage of an occurring higher-order mode with a simple structure, and which can realize highly reliable spectrum measurement, signal analysis, and signal generation which are not affected by the higher-order mode, by applying the structure. In a higher-order mode suppressor, a ridge waveguide portion is configured with dimensions such that an inner diameter of a waveguide path is narrower than inner diameters of waveguide paths of waveguides, and when a frequency band including a basic frequency band is input from an input side, the higher-order mode occurring on the input side is suppressed with respect to a frequency band of twice or more than a cutoff frequency.

12 Claims, 14 Drawing Sheets

(56) References Cited

U.S. PATENT DOCUMENTS

| | | | | |
|---|---|---|---|---|
| 8,248,178 | B2 * | 8/2012 | Lange | H01P 1/171<br>333/21 R |
| 11,374,298 | B1 * | 6/2022 | Wrigley | H01P 11/007 |
| 2012/0171981 | A1 * | 7/2012 | Hiers | H01Q 13/0275<br>455/334 |

* cited by examiner

B-B Cross section

C-C Cross section

HIGHER-ORDER MODE SUPPRESSOR, WAVEGUIDE FILTER DEVICE USING SAME, SPECTRUM ANALYZER, SIGNAL ANALYZER, SIGNAL GENERATION DEVICE, HIGHER-ORDER MODE SUPPRESSION CONTROL METHOD, AND FILTER CONFIGURATION METHOD

TECHNICAL FIELD

The present invention relates to a higher-order mode suppressor in a waveguide filter, a waveguide filter device using the higher-order mode suppressor, a spectrum analyzer, a signal analyzer, a signal generation device, a higher-order mode suppression control method, and a filter configuration method.

BACKGROUND ART

In recent years, an information society has been developed, and the amount of information used in various types of communication has increased. For example, an analysis frequency required for a device such as a spectrum analyzer used for a performance test of a device under test (DUT) has also been shifted from a microwave band to a millimeter-wave band or a higher frequency band.

In the spectrum analyzer, when a signal having a frequency exceeding an upper limit frequency (for example, 60 GHz) that can be measured by a single device (exceeding 100 GHz) is analyzed, a down converter is provided as a front end, and a signal under test is input to the front end.

In a front stage of the front end that allows electromagnetic waves to propagate in a frequency band exceeding 100 GHz, a method for using a waveguide as a propagation path of the electromagnetic waves is known. In the spectrum analyzer having this configuration, a higher-order mode may occur in the waveguide used for propagation of the electromagnetic waves depending on a connection method or an operation, and satisfactory frequency conversion may not be performed due to influence of the higher-order mode, in some cases.

As this type of the spectrum analyzer, the following spectrum analyzer is known in the related art. Occurrence of a higher-order mode is suppressed in such a manner that a connection surface of one waveguide block in which different types of waveguides are connected in series, which is adopted in a path through which the electromagnetic waves propagate, is formed as a ridge structure. In this manner, satisfactory frequency conversion is available (for example, Patent Document 1).

RELATED ART DOCUMENT

Patent Document

[Patent Document 1] JP-A-2020-137031

DISCLOSURE OF THE INVENTION

Problem that the Invention is to Solve

In a device such as the spectrum analyzer disclosed in Patent Document 1, in some cases, a waveguide may be adopted not only for a propagation path between the DUTs, but also for an IF filter that filtering a signal (IF signal) in a band of an intermediate frequency (IF) subjected to frequency conversion by the front end, for example.

When a waveguide filter is used as the IF filter, the waveguide filter is generally operated in a basic mode. However, in order to obtain a higher analysis frequency, there appears a demand for operating the waveguide filter in a frequency band exceeding the basic mode.

However, in the waveguide filter in the related art used as the IF filter, when the waveguide filter is operated in the frequency band higher than the basic mode, a higher-order mode ($TE_{20}$ mode or the like) occurs, and there is a possibility that highly reliable spectrum measurement cannot be performed.

FIG. 14 shows frequency characteristics of this type of the waveguide filter in the related art. As shown in FIG. 14, in the waveguide filter in the related art, when the waveguide filter is operated in a frequency range (for example, a frequency range of 66 to 80 GHZ) exceeding a frequency range of 34 to 52 GHz in the basic mode, a passage of an unnecessary frequency signal which represents deterioration in transmission characteristic S21 remarkably appears due to generation of the higher-order mode.

In a case of the spectrum analyzer which adopts the waveguide filter having the frequency characteristics as shown in FIG. 14 as the IF filter, for example, the unnecessary frequency signal passing through the IF filter in the frequency range of 66 to 80 GHZ displays an unnecessary component which is an obstacle to measurement of spectrum characteristics. As a result, there is a possibility that highly reliable spectrum measurement cannot be performed.

As described above, there exists no waveguide filter in the related art, which has an effective higher-order mode suppression function (waveguide mode suppressor) that suppresses a higher-order mode when the waveguide filter is operated in the frequency range exceeding the basic mode. In addition, in a device in the related art such as the spectrum analyzer that adopts the waveguide filter having no effective function of suppressing the higher-order mode, it is difficult to realize highly reliable measurement or the like due to the received influence of the higher-order mode.

The present invention is made in order to solve the problems in the related art, and an object of the present invention is to provide a higher-order mode suppressor, a waveguide filter device using the same, a spectrum analyzer, a signal analyzer, a signal generation device, a higher-order mode suppression control method, and a filter configuration method, which can reliably prevent a passage of an occurring higher-order mode with a simple structure, and which can realize highly reliable spectrum measurement, signal analysis, and signal generation which are not affected by the higher-order mode, by applying the structure.

Means for Solving the Problem

According to claim 1 of the present invention, in order to solve the above-described problem, there is provided a higher-order mode suppressor provided between a first waveguide (70*a*) and a second waveguide (70*b*). The higher-order mode suppressor includes a ridge waveguide portion (50) having a ridge structure in which a waveguide path (51) penetrating in a longitudinal direction is provided and ridge portions (52*a*, 52*b*) are formed inside the waveguide path, a first ridge-waveguide conversion unit (60*a*) connected to one end surface (53*a*) of the ridge waveguide portion in a longitudinal direction and forming a ridge-waveguide converting waveguide path (61*a*) performing relay of radio wave propagation between the waveguide path having the ridge structure and a waveguide path (71*a*) of the first waveguide (70*a*), between an end surface (64*a*) facing the one end surface and an opposite side end surface (63*a*), and a second ridge-waveguide conversion unit (60*b*) connected to the other end surface (53*b*) of the ridge waveguide portion in the longitudinal direction and forming a ridge-waveguide converting waveguide path (61*b*) performing relay of radio wave propagation between the waveguide path having the ridge structure and a waveguide path (71*b*) of the second waveguide (70*b*), between an end surface (64*b*) facing the other end surface and an opposite side end surface (63*b*). In the ridge waveguide portion, an inner diameter of the waveguide path is narrower than inner diameters of the waveguide paths of the first waveguide and the second waveguide. The first waveguide and the second waveguide are respectively connected to the opposite side end surface of the first ridge-waveguide conversion unit and the opposite side end surface of the second ridge-waveguide conversion unit. When one of the first waveguide and the second waveguide is set as an input side and the other is set as an output side, and a frequency band exceeding a basic frequency band is input from the input side, the ridge waveguide portion is configured with dimensions for suppressing a higher-order mode occurring on the input side with respect to a frequency band of twice or more than a cutoff frequency band.

According to this configuration, the higher-order mode suppressor according to claim 1 of the present invention can reliably prevent a passage of the higher-order mode occurring on the input side due to an input of the frequency band of twice or more than a cutoff frequency with an extremely simple structure.

In addition, in the higher-order mode suppressor according to claim 2 of the present invention, a waveguide conforming to a predetermined waveguide standard may be connected as the first waveguide and the second waveguide. The ridge waveguide portion may be configured with dimensions such that the inner diameter of the waveguide path suppresses a $TE_{20}$ mode up to a desired frequency.

According to this configuration, the higher-order mode suppressor according to claim 2 of the present invention does not allow the higher-order mode to pass through even when the waveguide conforming to the predetermined waveguide standard is operated in a frequency band higher than the basic frequency band, and satisfactory frequency characteristics can be secured.

In the higher-order mode suppressor according to claim 3 of the present invention, in order to solve the above-described problem, the ridge waveguide portion may have a double ridge structure in which the ridge portion protrudes toward an inside of the waveguide path from inner surfaces (51*a*, 51*b*) facing each other in the waveguide path.

According to this configuration, the higher-order mode suppressor according to claim 3 of the present invention can reliably couple the basic frequency band and the ridge structure, and can avoid a situation where the basic frequency band does not pass through.

In addition, in the higher-order mode suppressor according to claim 4 of the present invention, inside the ridge-waveguide converting waveguide path of each of the first ridge-waveguide conversion unit and the second ridge-waveguide conversion unit, tapered ridge portions (62*a*1, 62*a*2, 62*b*1, 62*b*2) having heights gradually changing to be lower from an end surface facing the one end surface of the ridge waveguide portion to the opposite side end surface, and from an end surface facing the other end surface of the ridge waveguide portion to the opposite side end surface may be further formed.

According to this configuration, the higher-order mode suppressor according to claim 4 of the present invention can smoothly relay radio wave propagation between the waveguide path having the ridge structure and the waveguide paths of the first waveguide and the second waveguide while the higher-order mode is not allowed to pass through.

In the higher-order mode suppressor according to claim 5 of the present invention, the ridge-waveguide converting waveguide path of each of the first ridge-waveguide conversion unit and the second ridge-waveguide conversion unit may include a tapered waveguide path having an opening dimension continuously increasing from the end surface facing the one end surface of the ridge waveguide portion to the opposite side end surface, and from the end surface facing the other end surface of the ridge waveguide portion to the opposite side end surface.

According to this configuration, the higher-order mode suppressor according to claim 5 of the present invention can further smoothly relay the radio wave propagation between the waveguide path having the ridge structure and the waveguide paths of the first waveguide and the second waveguide while the higher-order mode is not allowed to pass through.

According to claim 6 of the present invention, in order to solve the above-described problem, there is provided a waveguide filter device including the higher-order mode suppressor (5, 81*b*) according to any one of claims 1 to 5, and a waveguide portion (80) including at least a waveguide bandpass filter (81*d*) in which a predetermined pass band is set, as a configuration element, and in which a plurality of the configuration elements are continuously connected in a longitudinal direction to form one waveguide path (80*a*). When one end of the waveguide portion is set as the input side and the other end is set as the output side, and a filtering operation is performed in the waveguide portion exceeding a basic frequency band input from the input side, the higher-order mode occurring on the input side with respect to a frequency band of twice or more than a cutoff frequency of the waveguide bandpass filter is suppressed by the higher-order mode suppressor, and is attenuated before reaching the waveguide bandpass filter.

According to this configuration, in the waveguide filter device according to claim 6 of the present invention, in the waveguide portion, the waveguide bandpass filter and the higher-order mode suppressor are used in combination. In this manner, even when the higher-order mode occurs in the frequency band of twice or more than the cutoff frequency, the higher-order mode suppressor can prevent the passage of the higher-order mode, and can avoid a situation where unnecessary frequency components are not sufficiently attenuated. In this manner, the waveguide filter device can perform a highly reliable bandpass filtering operation in a wide frequency range exceeding the cutoff frequency up to the frequency band of twice or more than the cutoff frequency.

In addition, the waveguide filter device according to claim 7 of the present invention may further include a first coaxial waveguide converter (85*a*) connected perpendicularly to the waveguide portion in the one end of the waveguide portion, accommodating a coaxial cable (86*a*), and performing coaxial waveguide conversion with the waveguide path in the one end of the waveguide portion, and a second coaxial waveguide converter (85*b*) connected perpendicularly to the waveguide portion in the other end of the waveguide portion, accommodating a coaxial cable (86*b*), and performing coaxial waveguide conversion with the waveguide path in the other end of the waveguide portion. The waveguide portion, the first coaxial waveguide converter, and the second coaxial waveguide converter may form a coaxial waveguide conversion device.

According to this configuration, the waveguide filter device according to claim 7 of the present invention can be operated as the waveguide filter device including the coaxial waveguide conversion device having a higher-order mode suppression function, and is suitable for applications in an IF filter or an RF filter of devices such as a spectrum analyzer, a signal analyzer, a signal generation device, and the like.

According to claim 8 of the present invention, in order to solve the above-described problems, there is provided a spectrum analyzer (1) including a frequency conversion unit (100) including a filter (113) supplying a signal under test having a predetermined frequency component together with a local signal output from a local signal generator (112) to a mixer (111) and extracting a signal in a predetermined intermediate frequency band from a mixing output, and a wave detector (120) detecting the signal in the intermediate frequency band, the spectrum analyzer (1) obtaining spectrum characteristics of the signal under test by changing a frequency of the local signal in accordance with an analysis target frequency. The waveguide filter device according to claim 6 or 7 is used for the filter. The waveguide portion of the waveguide filter device inputs the mixing output, allows a frequency band corresponding to a pass band of the waveguide bandpass filter to pass through, and suppresses a higher-order mode occurring in a high frequency band of twice or more than a cutoff frequency by the higher-order mode suppressor.

According to this configuration, in the spectrum analyzer according to claim 8 of the present invention, in the filter extracting the IF signal, while the frequency band corresponding to the pass band of the waveguide bandpass filter is allowed to pass through, a stopband can be widened to the high frequency band of twice or more than the cutoff frequency. Highly reliable spectrum characteristics are measured for a millimeter-wave band or a higher frequency band as a target.

According to claim 9 of the present invention, in order to solve the above-described problem, there is provided a signal analyzer (2) including a frequency conversion unit (100B) including a filter (113B) supplying a signal under test having a predetermined frequency component together with a local signal output from a local signal generator (112B) to a mixer (111B) and extracting a signal in a predetermined intermediate frequency band from a mixing analyzing output, and a signal analysis unit (153B) a waveform of the digital signal after the signal in the intermediate frequency band is converted into a digital signal by using an ADC (125). The signal analyzer (2) analyzes a waveform of the signal under test by changing a frequency of the local signal in accordance with an analysis target frequency. The waveguide filter device according to claim 6 or 7 is used for the filter. The waveguide portion of the waveguide filter device inputs the mixing output, allows a frequency band corresponding to a pass band of the waveguide bandpass filter to pass through, and suppresses a higher-order mode occurring in a high frequency band of twice or more than a cutoff frequency by the higher-order mode suppressor.

According to this configuration, in the signal analyzer according to claim 9 of the present invention, in the filter extracting the IF signal, while the frequency band corresponding to the pass band of the waveguide bandpass filter is allowed to pass through, the stopband can be widened to the high frequency band of twice or more than the cutoff frequency. Highly reliable signal analysis can be performed on a millimeter-wave band or a higher frequency band as a target.

According to claim 10 of the present invention, in order to solve the above-described problem, there is provided a signal generation device (3) including a frequency conversion unit (100B) allowing a test signal in an intermediate frequency band output from a signal generation unit (130) to pass through a filter (113B) extracting a signal in a predetermined intermediate frequency band, supplying the test signal together with a local signal output from a local signal generator (112B) to a mixer (111B), and converting the test signal into a millimeter-wave band signal, the signal generation device (3) changing a frequency of the local signal in accordance with a test target frequency for testing a device under test (DUT) and transmitting a signal subjected to frequency conversion by the frequency conversion unit as a test signal of the device under test. The waveguide filter device according to claim 6 or 7 is used for the filter. The waveguide portion of the waveguide filter device inputs the mixing output from the signal generation unit, allows a frequency band corresponding to a pass band of the waveguide bandpass filter to pass through, and suppresses a higher-order mode occurring in a high frequency band of twice or more than a cutoff frequency by the higher-order mode suppressor.

According this configuration, in the signal generation device according to claim 10 of the present invention, in the filter extracting the IF signal, the stopband can be widened to the high frequency band of twice or more than the cutoff frequency while the frequency band corresponding to the band pass of the waveguide bandpass filter is allowed to pass through. A highly reliable test signal in the frequency band of a millimeter-wave band or a higher frequency band can be transmitted, and test quality of the DUT can be improved.

According to claim 11 of the present invention, in order to solve the above-described problem, there is provided a higher-order mode suppression control method using the higher-order mode suppressor according to any one of claims 1 to 5. The higher-order mode suppression control method includes a step (S01) of respectively connecting the first waveguide and the second waveguide to the opposite side end surface of the first ridge-waveguide conversion unit and the opposite side end surface of the second ridge-waveguide conversion unit, which are disposed on both sides of the ridge waveguide portion, a step (S02) of inputting a frequency band exceeding a basic frequency band from the input side, and a step (S03) of causing the ridge waveguide portion to perform an operation of suppressing a higher-order mode by the waveguide path having a ridge structure with respect to the input frequency band.

According to this configuration, the higher-order mode suppression control method according to claim 11 of the present invention adopts a simple structure and a simple processing step. Therefore, even when the frequency band higher than a recommended frequency band (basic frequency band) of the first waveguide and the second waveguide is input, the narrow waveguide path of the ridge waveguide portion can prevent the passage of the higher-order mode occurring at that time.

According to claim 12 of the present invention, in order to solve the above-described problem, there is provided a filter configuration method in the waveguide filter device (8) according to claim 7. The first coaxial waveguide converter (85*a*) is connected to the one end of the waveguide portion. The second coaxial waveguide converter (85*b*) is connected to the other end of the waveguide portion. In the waveguide portion, the first ridge-waveguide conversion unit, the ridge waveguide portion, and the second ridge-waveguide conversion unit, which are elements of the higher-order mode suppressor, are sequentially disposed in the longitudinal direction, between a side of the first coaxial waveguide converter and a side of the second coaxial waveguide converter. The waveguide bandpass filter is disposed on a side opposite to the ridge waveguide portion of at least one of the first ridge-waveguide conversion unit and the second ridge-waveguide conversion unit.

According to this configuration, the filter configuration method according to claim 12 of the present invention can easily realize the waveguide filter device including the coaxial waveguide conversion device having a higher-order mode suppression function, which is suitable as the IF filter or the RF filter of devices such as a spectrum analyzer, a signal analyzer, a signal generation device, and the like.

Advantage of the Invention

According to the present invention, it is possible to provide a higher-order mode suppressor, a waveguide filter device using the same, a spectrum analyzer, a signal analyzer, a signal generation device, a higher-order mode suppression control method, and a filter configuration method, which can reliably prevent a passage of an occurring higher-order mode with a simple structure, and which can realize highly reliable spectrum measurement, signal analysis, and signal generation which are not affected by the higher-order mode, by applying the structure.

BRIEF DESCRIPTION OF THE DRAWINGS

FIGS. 3A and 3B are views showing a cross-sectional structure of the higher-order mode suppressor according to the embodiment of the present invention, FIG. 3A is a cross-sectional view taken along line B-B in FIG. 2, and FIG. 3B is a cross-sectional view taken along line C-C in FIG. 2.

FIGS. 4A and 4B are exploded perspective views of the cross-sectional structure shown in FIG. 2, FIG. 4A shows a structure of a left side portion including a ridge waveguide portion in FIG. 2, and FIG. 4B shows a structure of a right side portion including the ridge waveguide portion.

BEST MODE FOR CARRYING OUT THE INVENTION

Figure 1:
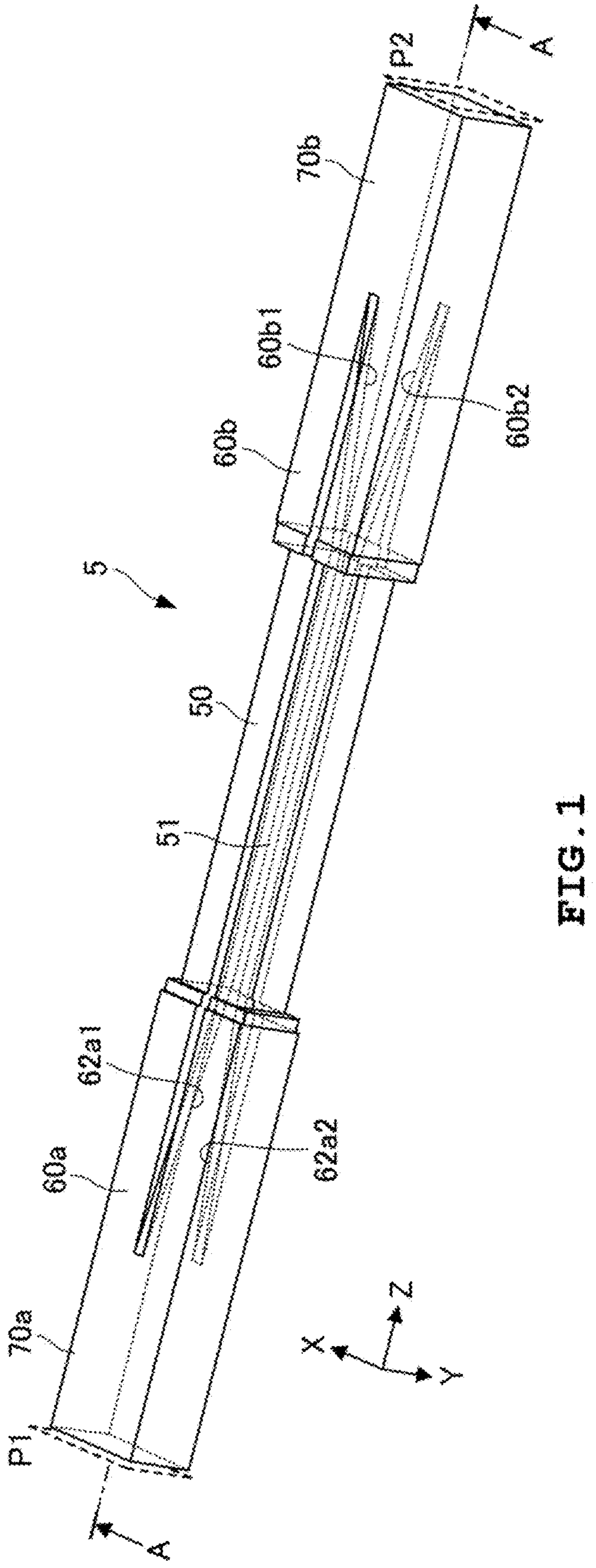
FIG. 1 is a perspective view showing an external structure of a higher-order mode suppressor according to an embodiment of the present invention.

Hereinafter, embodiments of a higher-order mode suppressor, a waveguide filter device using the same, a spectrum analyzer, a signal analyzer, a signal generation device, a higher-order mode suppression control method, and a filter configuration method according to the present invention will be described with reference to the drawings.

The higher-order mode suppressor according to the present invention is used to suppress a higher-order mode occurring when a waveguide conforming to a predetermined standard is operated at a frequency higher than a frequency band recommended for the waveguide.

The higher-order mode suppressor according to the present invention can exist alone as a functional component for suppressing a higher-order mode. In addition, the higher-order mode suppressor can be used as a waveguide filter device having a higher-order mode suppression function in combination with a waveguide filter. Furthermore, for example, the waveguide filter device having the higher-order mode suppression function can be mounted as an IF filter or an RF filter of devices, for example, such as a spectrum analyzer, a signal analyzer, a signal generation device, and the like.

In recent years, there has been an increasing demand for a transition of frequencies handled by the devices such as the spectrum analyzer, the signal analyzer, the signal generation device, and the like from a microwave band to a millimeter-wave band or a higher frequency band, and there is a request for a correspondence to the millimeter-wave band or the higher frequency band for the IF filter provided in an IF signal path and the RF filter provided in an RF signal path.

In response to the above-described request, it is conceivable that the waveguide filter device including the above-described higher-order mode suppressor as the IF filter or the RF filter is mounted on the spectrum analyzer, the signal analyzer, and the signal generation device.

As an example of the waveguide that realizes the waveguide filter device in combination with the higher-order mode suppressor, for example, a WR19 waveguide can be used. The WR19 waveguide functions as a high-pass filter that restricts the passage of a signal having a frequency component equal to or lower than a cutoff frequency (for example, 31.4 GHZ), and using the WR19 waveguide in a frequency band (for example, 60 to 80 GHz band) of twice or more than the cutoff frequency is not originally assumed. In the present invention, in view of the correspondence to the millimeter-wave band or the higher frequency band in the future, a situation in which the WR19 waveguide is intentionally operated in the frequency band (for example, 60 to 80 GHz band) of twice or more than the cutoff frequency is assumed. The present invention aims to establish a technique which can efficiently suppress the higher-order mode even when operated in the high frequency band.

In view of the above-described points, hereinafter, an embodiment of the higher-order mode suppressor 5 according to the present invention (refer to FIGS. 1 to 6), an embodiment of the waveguide filter device 8 using the higher-order mode suppressor 5 (refer to FIGS. 7 and 8), an embodiment of the spectrum analyzer 1 using the waveguide filter device 8 (refer to FIGS. 9 and 10), an embodiment of the signal analyzer 2 using the waveguide filter device 8 (refer to FIG. 11), and an embodiment of the signal generation device 3 using the waveguide filter device 8 (refer to FIGS. 12 and 13) will be sequentially described.

(Higher-Order Mode Suppressor)

As shown in FIG. 1, the higher-order mode suppressor 5 according to the present embodiment includes a ridge waveguide portion 50 including a waveguide having a ridge structure, and ridge-waveguide conversion units 60*a* and 60*b* connected to both sides of the ridge waveguide portion 50 in a longitudinal direction (Z-direction).

Figure 2:
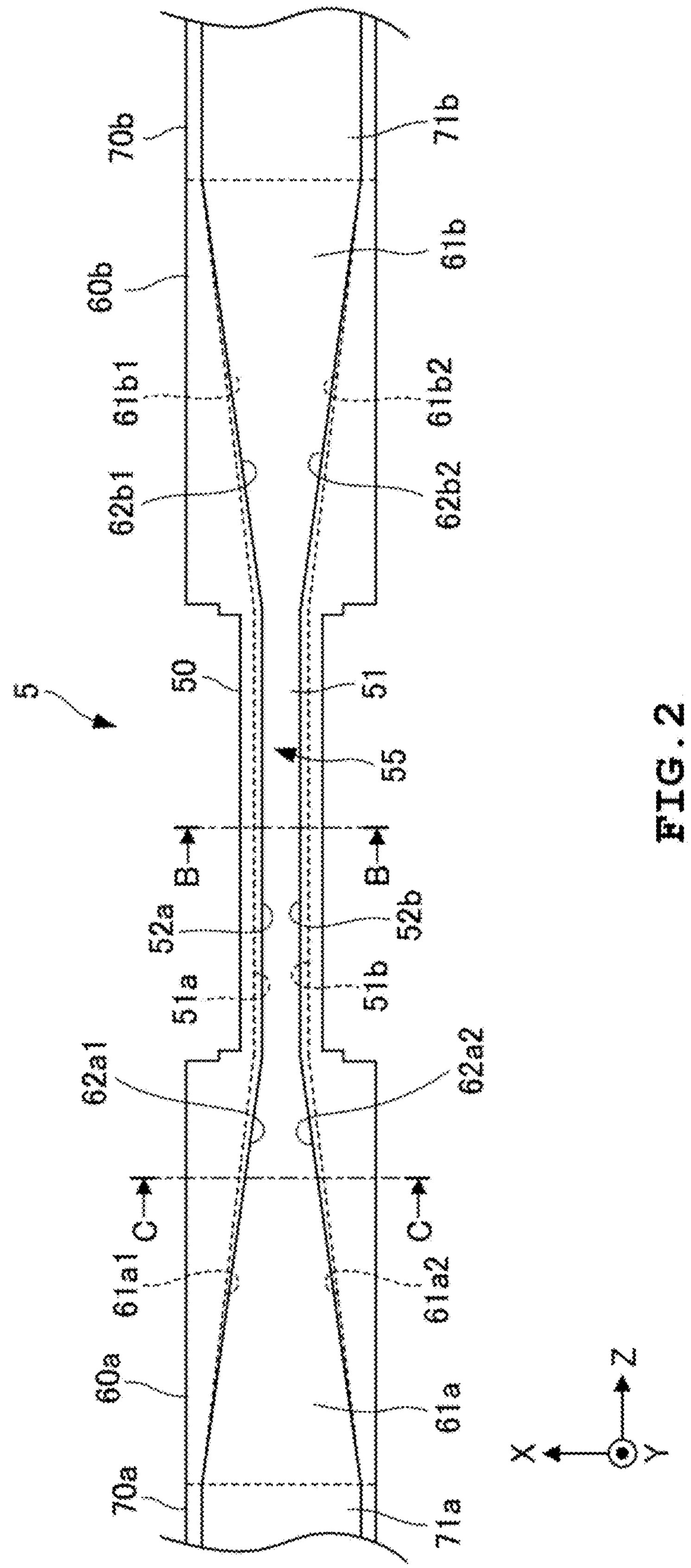
FIG. 2 is a view showing a cross-sectional structure of the higher-order mode suppressor according to the embodiment of the present invention, which is taken along line A-A in FIG. 1.
Figure 3A:
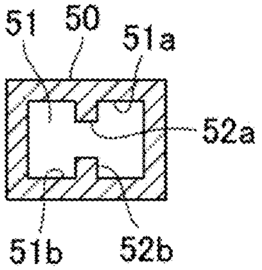
[FIGS. 3A and 3B]

In the higher-order mode suppressor 5, for example, as shown in FIGS. 2 and 3A, a waveguide path 51 having a rectangular cross section and internally penetrating along the longitudinal direction is formed in the ridge waveguide portion 50. For example, ridge portions 52*a* and 52*b* rising (protruding) inward of the waveguide path 51 from positions where the upper surface 51*a* and the lower surface 51*b* face each other and continuously extending in the longitudinal direction are provided inside the waveguide path 51. In this way, the ridge waveguide portion 50 has a ridge structure. The present embodiment adopts an example in which the ridge waveguide portion 50 has a double ridge structure in which the ridge portions 52*a* and 52*b* protrude inward of the waveguide path 51 from positions where the upper surface 51*a* and the lower surface 51*b* of the waveguide path 51 face each other. However, the present embodiment is not limited thereto, and a single ridge structure may be adopted. The upper surface 51*a* and the lower surface 51*b* each form an inner surface of the present invention.

In the ridge waveguide portion 50, the inner diameter of the waveguide path 51 is narrower than the inner diameters of the waveguide paths 71*a* and 71*b* of the waveguides 70*a* and 70*b* connected via the ridge-waveguide conversion units 60*a* and 60*b*. The inner diameter of the waveguide path 51 of the ridge waveguide portion 50 is determined in advance in correspondence to the waveguides 70*a* and 70*b*, and specifically, has dimensions which can suppress the higher-order mode ($TE_{20}$ mode or the like) when operated in the frequency band exceeding the frequency band (for example, the frequency of twice or more than the cutoff frequency) in which the waveguides 70*a* and 70*b* are recommended.

In the higher-order mode suppressor 5, sizes of openings (inner diameters) are significantly different between the waveguide path 51 of the ridge waveguide portion 50 and the waveguides 71*a* and 71*b* of the waveguides 70*a* and 70*b* to be disposed on both sides of the waveguide path 51. In order to mitigate a change in the opening (inner diameter) between the waveguide path 51 of the ridge waveguide portion 50 and the waveguides 71*a* and 71*b* of the waveguides 70*a* and 70*b*, ridge-waveguide conversion units 60*a* and 60*b* are respectively provided between the ridge waveguide portion 50 and the waveguide 70*a* and between the ridge waveguide portion 50 and the waveguide 70*b*.

Figures 4A, 4B:
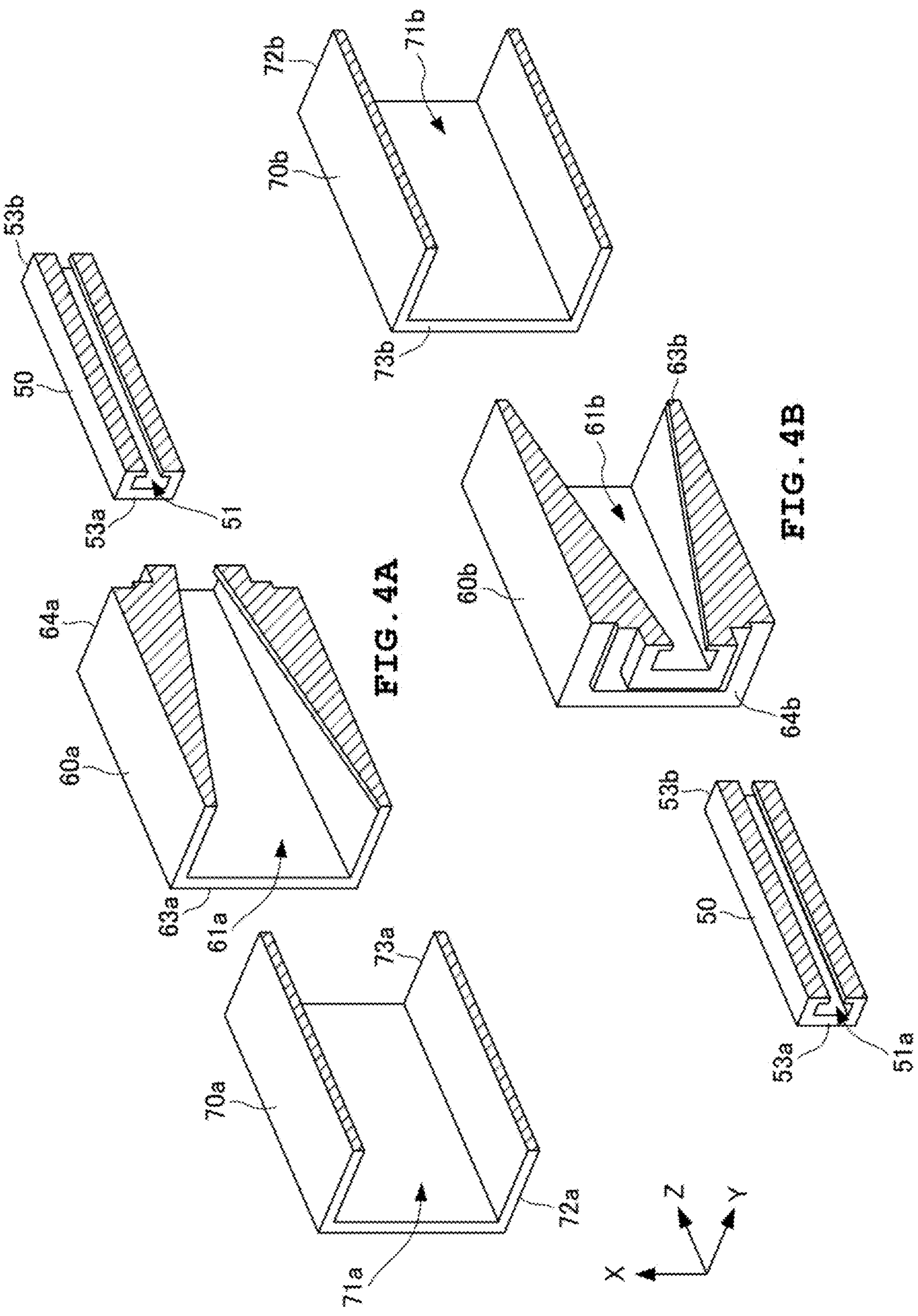
[FIGS. 4A and 4B]

As shown in FIGS. 2 and 4A, the ridge-waveguide conversion unit 60*a* is connected to one end surface 53*a* of the ridge waveguide portion 50 in the longitudinal direction, and a ridge-waveguide converting waveguide path 61*a* that relays radio wave propagation between the waveguide path 51 having a ridge structure and the waveguide 71*a* of the waveguide 70*a* is formed between an end surface 64*a* facing the one end surface 53*a* and an opposite side end surface 63*a*. The ridge-waveguide conversion unit 60*a* forms a first ridge-waveguide conversion unit of the present invention, and the waveguide 70*a* forms a first waveguide of the present invention.

As shown in FIGS. 2 and 4B, the ridge-waveguide conversion unit 60*b* is connected to the other end surface 53*b* of the ridge waveguide portion 50 in the longitudinal direction, and a ridge-waveguide converting waveguide path 61*b* that relays the radio wave propagation between the waveguide path 51 having a ridge structure and the waveguide 71*b* of the waveguide 70*b* is formed between an end surface 64*b* facing the other end surface 53*b* and an opposite side end surface 63*b*. The ridge-waveguide conversion unit 60*b* forms a second ridge-waveguide conversion unit of the present invention, and the waveguide 70*b* forms a second waveguide of the present invention.

Figure 3B:
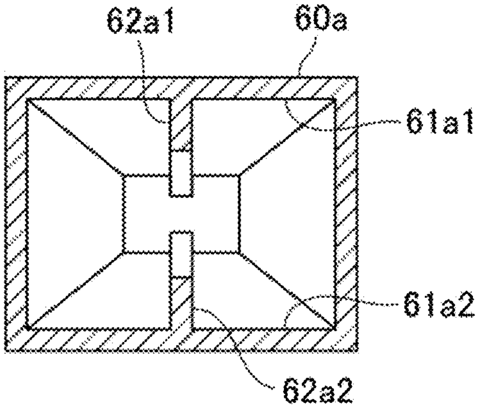

More specifically, as shown in FIGS. 2, 3B, and 4A, for example, the ridge-waveguide conversion unit 60*a* is configured such that the ridge-waveguide converting waveguide path 61*a* includes a tapered waveguide path whose dimension of the opening continuously increases to the opposite side end surface 63*a* from the end surface 64*a* corresponding to the one end surface 53*a* of the ridge-waveguide conversion unit 60*a*. Inside the tapered waveguide path of the ridge-waveguide converting waveguide path 61*a*, for example, on an upper surface 61*a*1 and a lower surface 61*a*2, ridge portions 62*a*1 and 62*a*2 having a tapered shape changing such that the height is gradually lowered are further formed to the opposite side end surface 63*a* from the end surface 64*a* corresponding to the one end surface 53*a* of the ridge waveguide portion 50. Here, the ridge-waveguide converting waveguide path 61*a* is not necessarily the tapered waveguide path, and may be a waveguide path having the ridge portions 62*a*1 and 62*a*2 and having a uniform inner diameter. In addition, the ridge-waveguide converting waveguide path 61*a* is not limited to the double-ridge structure as in the present example, and may have a single-ridge structure.

Similarly, as shown in FIGS. 2 and 4B, for example, the ridge-waveguide conversion unit 60*b* is configured such that the ridge-waveguide converting waveguide path 61*b* is a tapered waveguide path whose opening dimension continuously increases to the opposite side end surface 63*b* from the end surface 64*b* corresponding to the other end surface 53*b* of the ridge waveguide portion 50. Inside the tapered waveguide path of the ridge-waveguide converting waveguide path 61*b*, for example, on the upper surface 62*b*1 and the lower surface 62*b*2, ridge portions 61*b*1 and 61*b*2 having a tapered shape changing such that the height is gradually lowered are further formed to the opposite side end surface 63*b* from the end surface 64*b* corresponding to the other end surface 53*b* of the ridge waveguide portion 50. The ridge-waveguide converting waveguide path 61*b* is not necessarily the tapered waveguide path, and may be a waveguide path having the ridge portions 62*b*1 and 62*b*2 and having a uniform inner diameter. In addition, the ridge-waveguide converting waveguide path 61*a* is not necessarily a double ridge structure, and may be a single ridge structure.

The ridge-waveguide conversion unit 60*a*, the ridge waveguide portion 50, and the ridge-waveguide conversion unit 60*b* which have the above-described configuration are connected. In this manner, in the higher-order mode suppressor 5, for example, as shown in FIG. 2, a series of waveguide paths 55 is formed by the ridge-waveguide converting waveguide path 61*a* having a tapered shape of the ridge-waveguide conversion unit 60*a*, the waveguide path 51 of the ridge waveguide portion 50, and the ridge-waveguide converting waveguide path 61*b* having a tapered shape of the ridge-waveguide conversion unit 60*b*.

In this manner, as an operation form of the higher-order mode suppressor 5, for example, the following form can be adopted. The waveguide 70*a* is connected to the end surface 63*a* of the ridge-waveguide conversion unit 60*a* on the left side in FIG. 2 by the end surface 73*a*, and the waveguide 70*b* is connected to the end surface 63*b* of the ridge-waveguide conversion unit 60*b* on the right side in FIG. 2 by the end surface 73*b*.

In this operation form, for example, a WR19 waveguide is adopted as the waveguides 70*a* and 70*b* connected to the higher-order mode suppressor 5. Under this assumption, in the higher-order mode suppressor 5 according to the present embodiment, the waveguides 70*a* and 70*b* can be operated up to the frequency band (for example, exceeding 80 GHZ) of twice or more than the cutoff frequency, and moreover, a structure is adopted in which the occurrence of the higher-order mode is suppressed even in this case.

In a rectangular waveguide standard, the inner diameter of the WR19 waveguide is determined in advance as 4.775×2.388 (mm). Therefore, in the higher-order mode suppressor 5 according to the present embodiment, the ridge waveguide portion 50 has the waveguide path 51 having the inner diameter narrower than the inner diameter of the WR19 waveguide (waveguides 70*a* and 70*b*), and the dimensions of the waveguide path 51 are formed to be the dimensions in which an unnecessary mode (higher-order mode: $TE_{20}$ mode or the like) cannot exist even when operated in the required frequency band, for example, the frequency band exceeding the frequency of 80 GHZ.

Here, the description that the unnecessary mode does not arise in the required frequency band, that is, in the frequency band of twice or more than the cutoff frequency means that even the basic mode (for example, $TE_{10}$ mode) is not allowed to pass through in a lower mode. Therefore, the ridge waveguide portion 50 realizes a structure in which the waveguide path 51 adopts a ridge structure and the ridge structure enables the basic frequency band of the waveguide to pass through.

Next, a higher-order mode suppression function in the higher-order mode suppressor 5 according to the present embodiment will be verified. The present inventor performs an electromagnetic field simulation of frequency characteristics on an assumption of the following case. For example, as the waveguides 70*a* and 70*b*, the WR19 waveguide is used for the higher-order mode suppressor 5 (refer to FIGS. 1 to 4A and 4B) having the above-described configuration.

Figure 5:
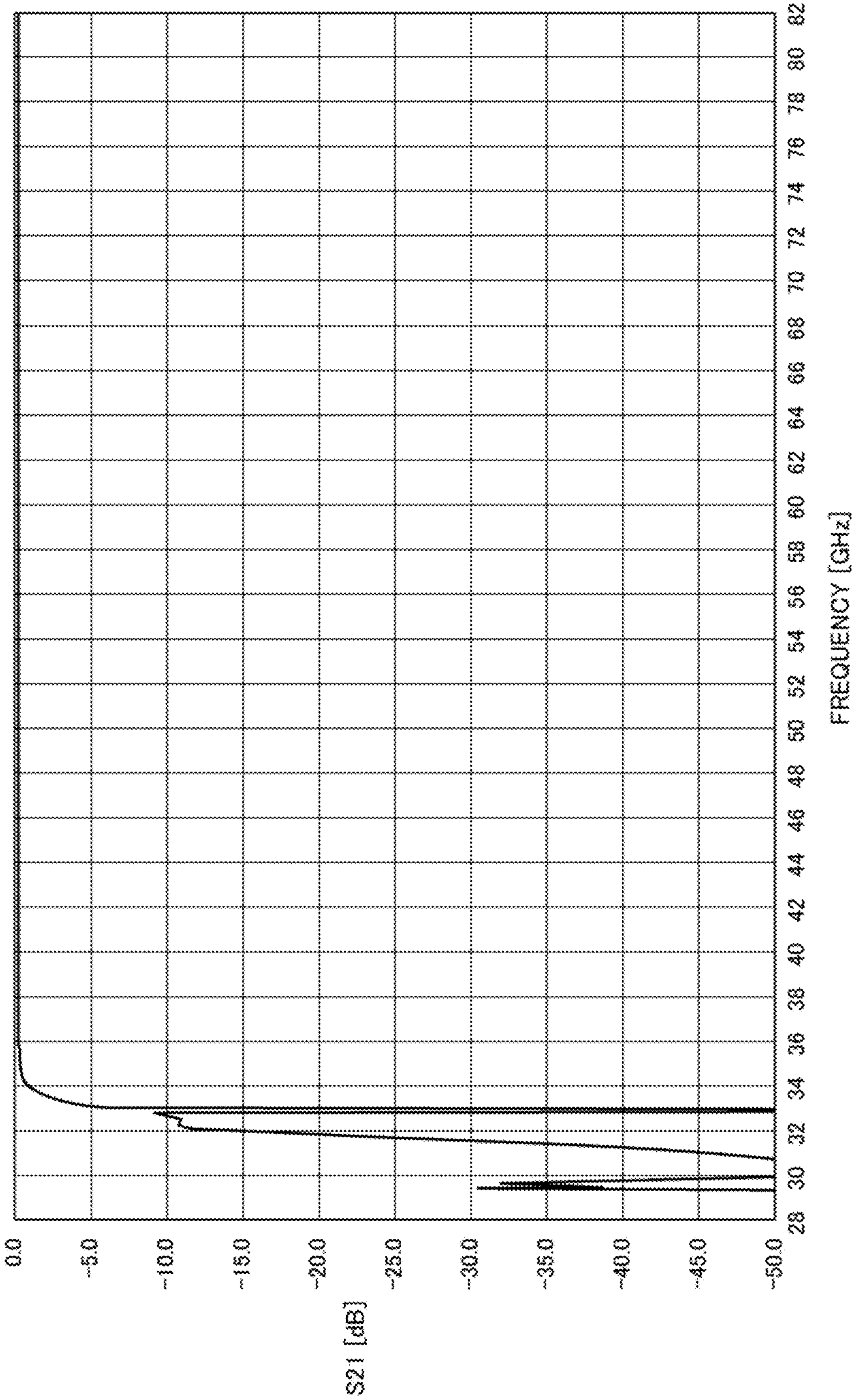
FIG. 5 is a graph showing frequency characteristics of the higher-order mode suppressor according to the embodiment of the present invention.
Figure 6:
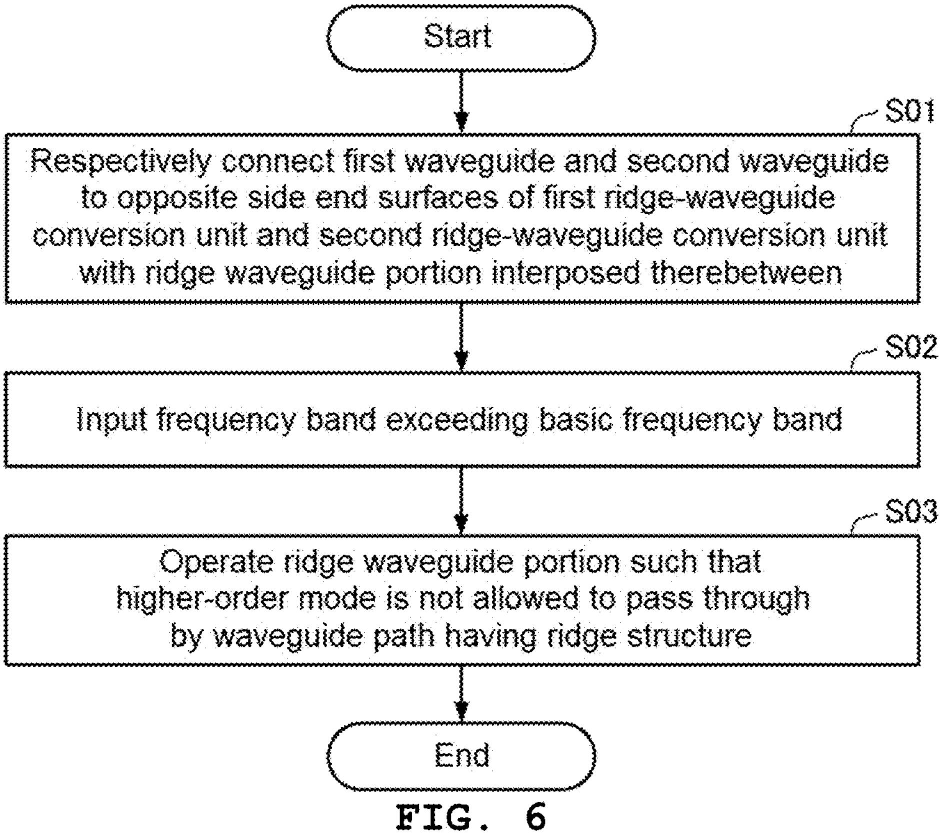
FIG. 6 is a flowchart showing an operation of the higher-order mode suppressor according to the embodiment of the present invention.

FIG. 5 shows measurement results in this case. The simulation result shown in FIG. 5 indicates that there exists no deterioration in transmission characteristics S21 even when operated in the frequency band of 60 to 80 GHZ exceeding 40 to 60 GHz which is a use frequency band of the WR19 waveguide.

In this way, according to the higher-order mode suppressor 5 in the present embodiment, the narrow waveguide path 51 of the ridge waveguide portion 50 is formed to have dimensions such that the unnecessary mode does not arise (higher-order mode is not allowed to pass through), for example, even when the waveguides 70*a* and 70*b* to be connected via the ridge-waveguide conversion units 60*a* and 60*b* are operated at the frequency of twice or more than the cutoff frequency (frequency exceeding 60 GHZ). In this manner, in the higher-order mode suppressor 5 according to the present embodiment, the passage of the occurring higher-order mode can be reliably prevented with an extremely simple structure. In addition, in the higher-order mode suppressor 5 according to the present embodiment, the waveguide path 51 of the ridge waveguide portion 50 adopts the ridge structure. Therefore, a situation where the basic mode (basic frequency band) is not allowed to pass through at the low frequency can be avoided.

(Higher-Order Mode Suppression Control Method Using Higher-Order Mode Suppressor 5)

In the higher-order mode suppressor 5 according to the present embodiment, the higher-order mode suppression function can be realized by operating the higher-order mode suppressor 5 in the following procedure. The operation thereof will be described with reference to a flowchart shown in FIG. 6.

In the above-described operation, first, the higher-order mode suppressor 5 having the structure shown in FIG. 1 is prepared, and as shown in FIGS. 4A and 4B, the waveguides 70*a* (first waveguide) and 70*b* (second waveguide) are respectively connected to the end surface 63*a* of the first ridge-waveguide conversion unit 60*a* and the end surface 63*b* of the second ridge-waveguide conversion unit 60*b* with the ridge waveguide portion 50 interposed therebetween (Step S01).

For example, the waveguides 70*a* and 70*b* are configured to include the WR19 waveguide, and can receive the frequency (for example, the frequency of twice or more than the cutoff frequency) higher than the frequency band (basic frequency band) recommended for the waveguide conforming to the standard.

In a state where the waveguides 70*a* and 70*b* are connected as described above (refer to Step S01), the frequency band including the basic frequency band is input to the higher-order mode suppressor 5 (Step S02). Specifically, the frequency band (including the frequency band of twice or more than the cutoff frequency) including the basic frequency band is input from a port P1 to the waveguide 70*a*, is caused to propagate through the inside of the waveguide path 55 to the waveguide 70*b*, and thereafter, is output from the waveguide 70*b* to a port P2 (Step S02).

Furthermore, during a radio wave propagation operation thereof, the ridge waveguide portion 50 is operated such that the higher-order mode is not allowed to pass through by the waveguide path 51 having the ridge structure (Step S03).

In this way, according to the higher-order mode suppression control method using the higher-order mode suppressor 5 according to the present embodiment, processes include a step (S01) of respectively connecting the first waveguide 70*a* and the second waveguide 70*b* to the first ridge-waveguide conversion unit 60*a* and the second ridge-waveguide conversion unit 60*b* which are disposed on both sides of the ridge waveguide portion 50, a step (S02) of inputting the frequency band (including the frequency band of twice or more than the cutoff frequency) including the basic frequency band from the input side, and a step (S03) of operating the ridge waveguide portion 50 for the input frequency band such that the higher-order mode is not allowed to pass through by the waveguide path 51 having the ridge structure. Through the processes, even when the frequency band higher than the recommended frequency band (basic frequency band) of the waveguides 70*a* and 70*b* is input, the passage of the higher-order mode occurring at that time can be prevented by the narrow waveguide path 51 of the ridge waveguide portion 50.

As described above, the higher-order mode suppressor 5 according to the present embodiment includes the ridge waveguide portion 50 having a ridge structure in which the waveguide path 51 penetrating in the longitudinal direction is provided and the ridge portions 52*a* and 52*b* are formed inside the waveguide path 51, the first ridge-waveguide conversion unit 60*a* connected to the one end surface 53*a* of the ridge waveguide portion 50 in the longitudinal direction and forming the ridge-waveguide converting waveguide path 61*a* performing relay of the radio wave propagation between the waveguide path 51 having the ridge structure and the waveguide path 71*a* of the first waveguide 70*a*, between the end surface 64*a* facing the one end surface 53*a* and the opposite side end surface 63*a*, and the second ridge-waveguide conversion unit 60*b* connected to the other end surface 53*b* of the ridge waveguide portion 50 in the longitudinal direction and forming the ridge-waveguide converting waveguide path 61*b* performing radio wave propagation between the waveguide path 51 having the ridge structure and the waveguide path 71*b* of the second waveguide 70*b*, between the end surface 64*b* corresponding to the other end surface 53*b* and the opposite side end surface 63*b*. In the ridge waveguide portion 50, the inner diameter of the waveguide path 51 is narrower than the inner diameters of the waveguide paths 71*a* and 71*b* of the first waveguide 70*a* and the second waveguide 70*b*. The first waveguide 70*a* and the second waveguide 70*b* are respectively connected to the opposite side end surface of the first ridge-waveguide conversion unit 60*a* and the opposite side end surface of the second ridge-waveguide conversion unit 60*b*. When one of the first waveguide 70*a* and the second waveguide 70*b* is set as the input side and the other is set as the output side, and the frequency band exceeding the basic frequency band is input from the input side, the ridge waveguide portion 50 is configured with dimensions which can prevent the passage of the higher-order mode occurring on the input side with respect to the frequency band of twice or more than the cutoff frequency band.

According to this configuration, the higher-order mode suppressor 5 according to the present embodiment can reliably prevent the passage of the higher-order mode occurring on the input side due to the input of the frequency band of twice or more than the cutoff frequency with an extremely simple structure.

In addition, in the higher-order mode suppressor 5 according to the present embodiment, the waveguides conforming to the desired waveguide standard (for example, WR19) may be connected as the first waveguide 70*a* and the second waveguide 70*b*, and the ridge waveguide portion 50 may be configured such that the inner diameter of the waveguide path 51 is the dimension in which the $TE_{20}$ mode up to the desired frequency (for example, 80 GHZ) does not pass through.

According to this configuration, the higher-order mode suppressor 5 according to the present embodiment does not allow the higher-order mode to pass through, even when the waveguides 70*a* and 70*b* conforming to the standard of WR19 and the like are operated in the frequency band higher than the basic frequency band, and in this manner, satisfactory frequency characteristics can be secured.

In addition, in the higher-order mode suppressor 5 according to the present embodiment, the ridge waveguide portion 50 has the double ridge structure in which the ridge portions 52*a* and 52*b* protrude toward the inside of the waveguide path 51 from the upper surface 51*a* and the lower surface 51*b* which face each other in the waveguide path 51.

According to this configuration, the higher-order mode suppressor 5 according to the present embodiment can reliably couple the basic frequency band and the ridge structure, and can avoid a situation where the basic frequency band does not pass through.

In addition, in the higher-order mode suppressor 5 according to the present embodiment, in the first ridge-waveguide conversion unit 60*a* and the second ridge-waveguide conversion unit 60*b*, inside each of the ridge-waveguide converting waveguide paths 61*a* and 61*b*, the ridge portions (62*a*1, 62*a*2, 62*b*1, 62*b*2) having a tapered shape changing such that the height is gradually lowered are further formed to the opposite side end surface 63*a* from the end surface 64*a* corresponding to the one end surface 53*a* of the ridge waveguide portion 50, and to the opposite side end surface 63*b* from the end surface 64*b* corresponding to the other end surface 53*b* of the ridge waveguide portion 50.

According to this configuration, the higher-order mode suppressor 5 according to the present embodiment can smoothly relay the radio wave propagation between the waveguide path 51 having the ridge structure and the waveguide paths (61*a*, 61*b*) of the first waveguide 70*a* and the second waveguide 70*b* while the higher-order mode is not allowed to pass through.

In the higher-order mode suppressor 5 according to the present embodiment, in the first ridge-waveguide conversion unit 60*a* and the second ridge-waveguide conversion unit 60*b*, each of the ridge-waveguide converting waveguide paths 61*a* and 61*b* may be configured to include the tapered waveguide path whose opening dimension continuously increases to the opposite side end surface 63*a* from the end surface 64*a* corresponding to the one end surface 53*a* of the ridge waveguide portion 50, and to the opposite side end surface 63*b* from the end surface 64*b* corresponding to the other end surface 53*b* of the ridge waveguide portion 50.

According to this configuration, the higher-order mode suppressor 5 according to the present invention can further smoothly relay the radio wave propagation between the waveguide path 51 having the ridge structure and the waveguide paths (71*a*, 71*b*) having the ridge structure and the first waveguide 70*a* and the second waveguide 70*b* while the higher-order mode is not allowed to pass through.

(Waveguide Filter Device Using Higher-Order Mode Suppressor 5)

Figure 7:
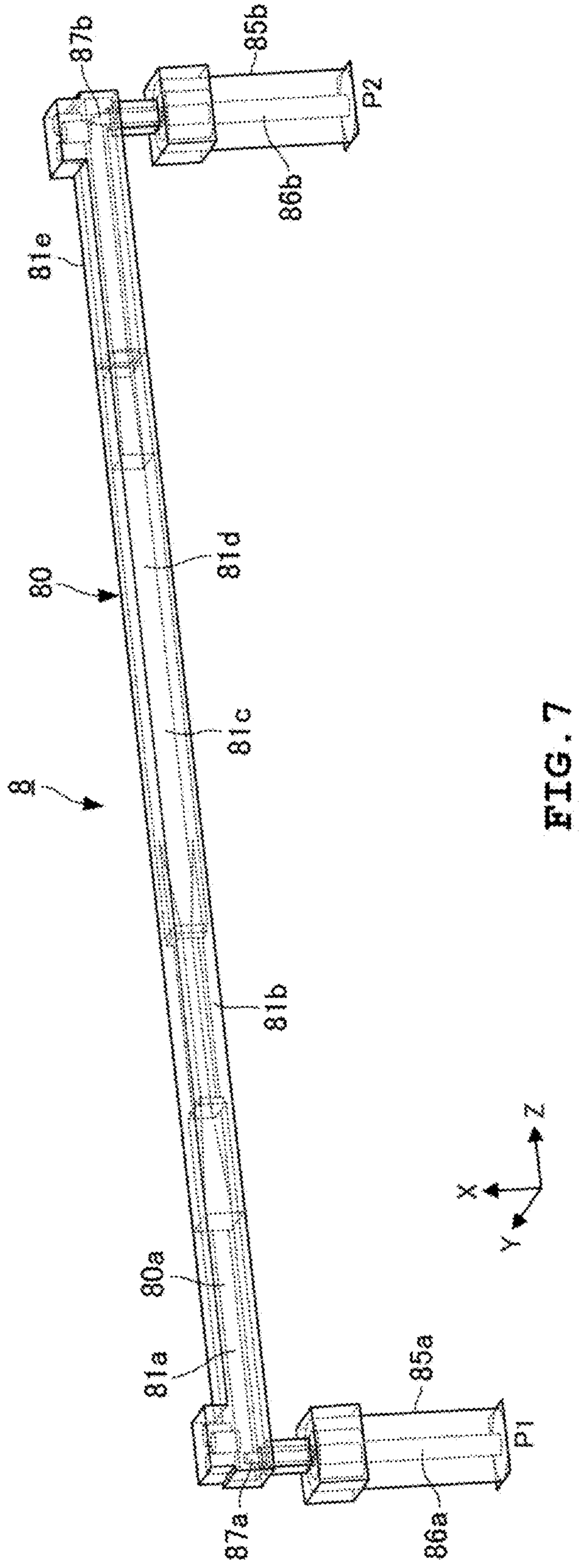
FIG. 7 is a view showing an external configuration of a waveguide filter device using the higher-order mode suppressor according to the embodiment of the present invention.

FIG. 7 shows a configuration example of the waveguide filter device 8 according to an embodiment of the present invention using the higher-order mode suppressor 5.

As shown in FIG. 7, the waveguide filter device 8 according to the present embodiment includes a waveguide portion 80 and coaxial waveguide converters 85*a* and 85*b* connected to both ends of the waveguide portion 80 in a length direction (Z-direction) at right angles to the waveguide portion 80. The coaxial waveguide converters 85*a* and 85*b* are connection circuit elements that convert coaxial lines having different propagation modes and the waveguide into each proper propagation mode.

In the waveguide filter device 8 according to the present embodiment, the waveguide portion 80 is configured such that a waveguide 81*a*, a higher-order mode suppressor 81*b*, a waveguide 81*c*, a waveguide bandpass filter (hereinafter, a bandpass filter) 81*d*, and a waveguide 81*e* are sequentially connected in the length direction from the coaxial waveguide converter 85*a* side to the coaxial waveguide converter 85*b* side. As the higher-order mode suppressor 81*b*, the above-described higher-order mode suppressor 5 (refer to FIGS. 1 to 4A and 4B) can be used. In the waveguide portion 80, a waveguide path 80*a* by which respective waveguide paths of a waveguide 81*a*, a higher-order mode suppressor 81*b*, a waveguide 81*c*, a bandpass filter 81*d*, and a waveguide 81*e* are connected in series is formed.

On the other hand, the coaxial waveguide converters 85*a* and 85*b* respectively accommodate coaxial cables 86*a* and 86*b*. In the coaxial cables 86*a* and 86*b*, a predetermined length of coating of a core wire is removed in tip portions thereof, and the core wire from which the coating is removed protrudes upward.

In the waveguide portion 80, the core wires from which the coating is removed in the coaxial cables 86*a* and 86*b* accommodated in the coaxial waveguide converters 85*a* and 85*b* are respectively inserted as probes into the waveguide path 80*a* of the waveguides 81*a* and 81*e* provided to correspond to the coaxial waveguide converters 85*a* and 85*b*.

In the coaxial waveguide converters 85*a* and 85*b*, the accommodated coaxial cables 86*a* and 86*b* are respectively connected as the probes to the ports P1 and P2 in opposite side end portions of the core wires. In the configuration shown in FIG. 7, the coaxial waveguide converters 85*a* and 85*b* respectively form a first coaxial waveguide converter and a second coaxial waveguide converter of the present invention.

In the waveguide filter device 8 having the above-described configuration, a coaxial mode is converted into a waveguide mode between the port P1 and the port P2, and the radio wave is caused to propagate inside the waveguide path 80*a* of the waveguide portion 80 from the waveguide 81*a* side to the waveguide 81*e* side. Here, in the coaxial waveguide converter 85*b* corresponding to the waveguide 81*e*, the radio wave is converted from the waveguide mode to the coaxial mode, and is output to the port P2 via the coaxial cable 86*b*.

In the waveguide filter device 8 performing a coaxial waveguide conversion processing operation between the port P1 and the port P2 as described above, a higher-order mode suppressor 81*b* and a bandpass filter 81*d* are adopted as elements of the waveguide portion 80 forming the waveguide path 80*a*. In this manner, in the waveguide filter device 8, even when the bandpass filter 81*d* is operated at the frequency of twice or more than the cutoff frequency, the higher-order mode suppression function of the higher-order mode suppressor 81*b* can realize the coaxial waveguide conversion processing operation in a state where the higher-order mode is suppressed.

Figure 8:
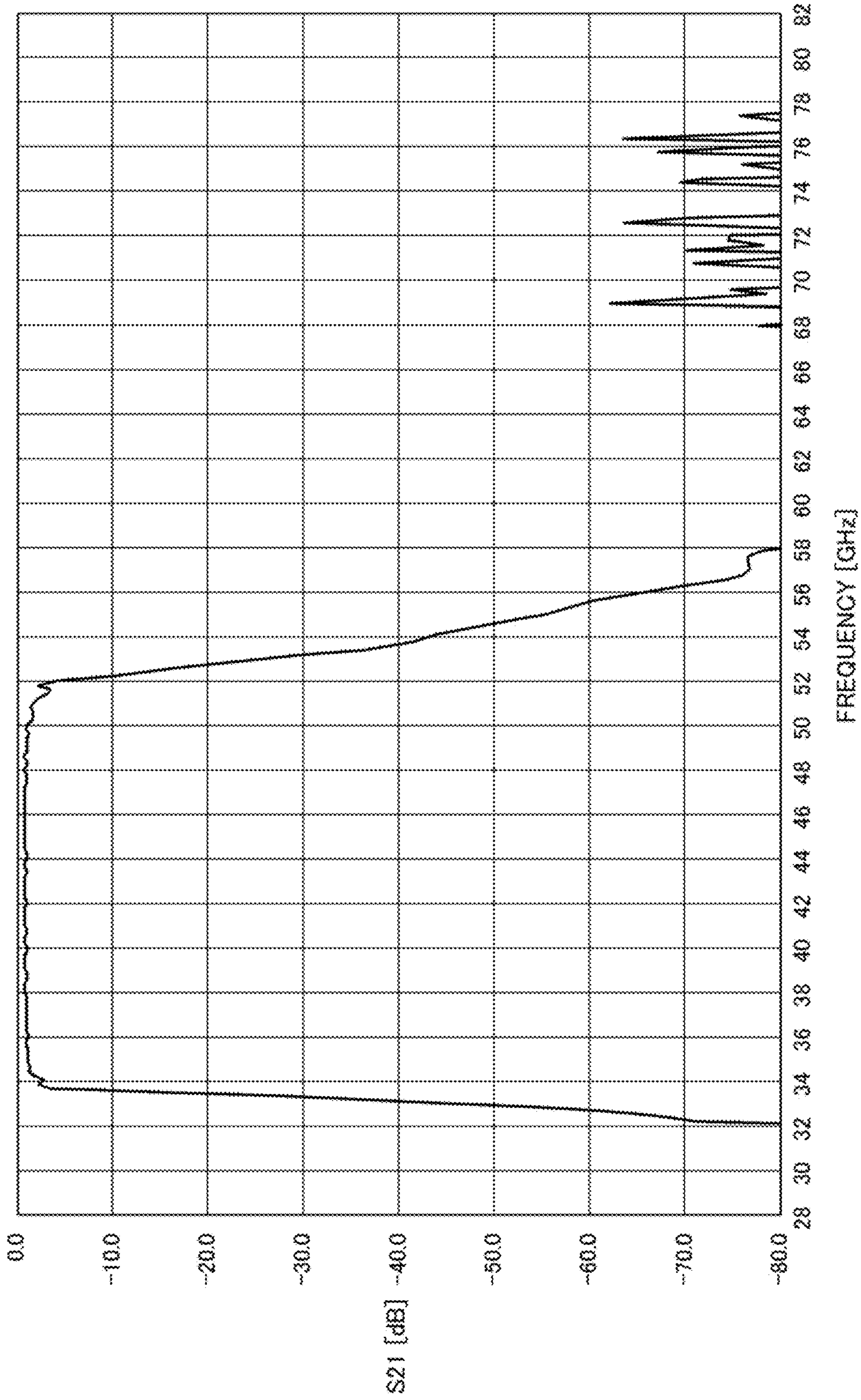
FIG. 8 is a graph showing frequency characteristics of a waveguide filter device according to the embodiment of the present invention, which is shown in FIG. 7.

The higher-order mode suppression function in the waveguide filter device 8 according to the present embodiment will be verified. In the waveguide filter device 8 according to the present embodiment, the higher-order mode suppressor 81*b* forming the waveguide path 80*a* corresponds to the WR19 waveguide, for example, and FIG. 8 shows an example of a measurement result of frequency characteristics when the WR19 waveguide is applied as the bandpass filter 81*d*. The frequency characteristics shown in FIG. 8 are compared with the frequency characteristics of the waveguide filter of this type in the related art (refer to FIG. 14).

Figure 14:
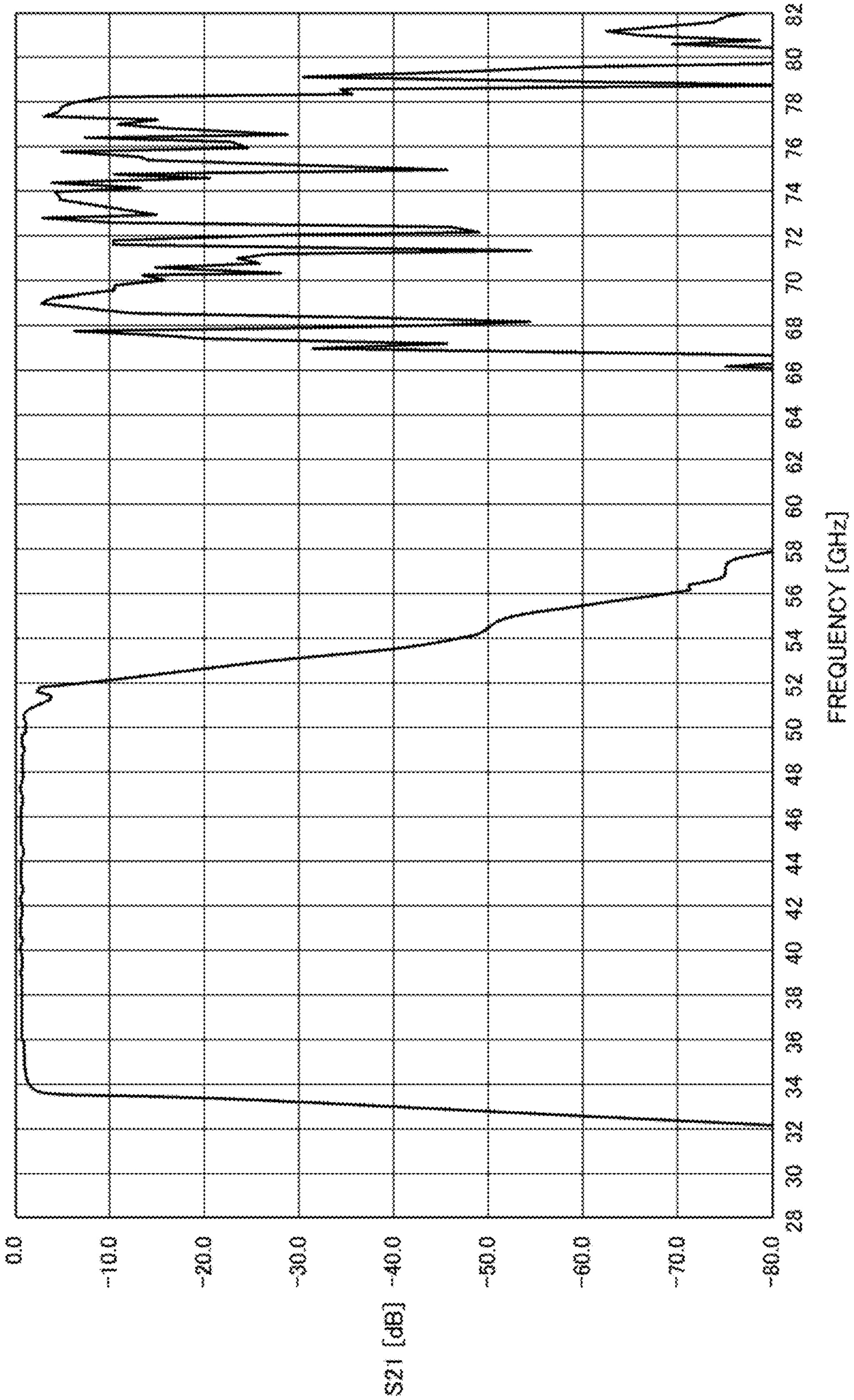
FIG.14 PRIOR ART
FIG. 14 is a graph showing frequency characteristics of a waveguide filter in the related art, which is used as the IF filter of the spectrum analyzer.

According to the configuration (refer to FIG. 7) of the waveguide filter device 8 in the present embodiment, the higher-order mode occurs in the coaxial waveguide converter 85*a* on the input side. In the related art, the higher-order mode suppression function (higher-order mode suppressor 81*b*) is not provided. Therefore, the higher-order mode enters the bandpass filter 81*d* as it is. Here, the bandpass filter 81*d* is normally operated only in the basic mode. Therefore, the higher-order mode occurring in the high frequency band cannot be stopped, and is output as it is. In FIG. 14, it can be understood that a strange rise appears in the frequency band of 60 to 80 GHZ (frequency band of double or more than the frequency band of 31.4 GHz of the cutoff frequency of WR19) due to the output of the higher-order mode that cannot be stopped by the bandpass filter 81*d*.

On the other hand, in the waveguide filter device 8 according to the present embodiment, the higher-order mode suppressor 81*b* is adopted together with the bandpass filter 81*d* as a component of the waveguide portion 80. Therefore, in the waveguide filter device 8 according to the present embodiment, the higher-order mode occurring in the coaxial waveguide converter 85*a* on the input side is greatly attenuated before reaching the bandpass filter 81*d* by the higher-order mode suppression function of the narrow ridge waveguide portion 50 of the higher-order mode suppressor 81*b*. In FIG. 8, the signal in the same frequency band (60 to 80 GHz) as that described with reference to FIG. 14 is greatly attenuated due to the reason (due to an attenuation action of the higher-order mode suppression function).

In FIGS. 8 and 14, it is a desirable operation in which the signal is less attenuated in the frequency band of 32 to 52 GHz. The reason is as follows. The bandpass filter 81*d* is designed such that the signal passes through in the frequency band and other frequencies are attenuated. In short, the bandpass filter 81*d* is used in combination with the higher-order mode suppressor 81*b*. In this manner, while a preset pass band (32 to 52 GHZ) is allowed to pass through without any problem (with less attenuation), it is possible to perform an operation of significantly attenuating an unnecessary signal in the frequency band of twice (63 GHZ) or more than the cutoff frequency.

In this way, the waveguide filter device 8 according to the present embodiment is provided with the higher-order mode suppression function (using the bandpass filter 81*d* and the higher-order mode suppressor 81*b* in combination). In this manner, for example, when operated in a frequency range exceeding 36 to 80 GHz, even when the higher-order mode occurs in a frequency band of twice the cutoff frequency (in a case of WR19, a frequency band of 31.4×2≈63 GHZ or more), the higher-order mode suppressor 81*b* can prevent the passage of the higher-order mode, and a situation in which the transmission characteristics S21 are not sufficiently attenuated due to the occurrence of the higher-order mode can be avoided.

In the waveguide filter device 8 according to the present embodiment, although a configuration example in which the WR19 waveguide is applied as the bandpass filter 81*d* of the waveguide portion 80 has been described, the present invention is not limited thereto. As a matter of course, a configuration in which the bandpass filter 81*d* conforming to another standard other than WR19 (rectangular waveguide standard), or a configuration of using a high-pass filter and the like can be similarly realized. In addition, the waveguide filter device 8 according to the present embodiment can be operated as the waveguide filter device having the higher-order mode suppression function, even when the waveguide portion 80 provided with the bandpass filter 81*d* and the higher-order mode suppressor 81*b* is used alone.

In a waveguide filter system having the higher-order mode suppression function as in the waveguide filter device 8 according to the present embodiment, the waveguide filter system is mounted on various devices including the spectrum analyzer. In this manner, even when the higher-order mode occurs in the frequency band of twice or more than the cutoff frequency, the higher-order mode is not allowed to pass through, and the waveguide filter system is operated such that the transmission characteristics S21 are sufficiently attenuated.

In this way, as configuration elements, the waveguide filter device 8 according to the present embodiment includes the higher-order mode suppressor 81*b* corresponding to the higher-order mode suppressor 5 (refer to FIG. 1) described in the above-described embodiment, and the waveguide portion 80 including at least the waveguide bandpass filter 81*d* in which a predetermined pass band is set, and in which a plurality of the configuration elements are continuously connected in the longitudinal direction to form one waveguide path 80*a*. When one end of the waveguide portion 80 is set as the input side and the other end is set as the output side, and the filtering operation is performed in the waveguide portion 80 with respect to the frequency band exceeding the basic frequency band input from the input side, the higher-order mode occurring on the input side with respect to the frequency band of twice or more than the cutoff frequency of the waveguide bandpass filter 81*d* is not allowed to pass through by the higher-order mode suppressor 81*b*, and is attenuated before reaching the waveguide bandpass filter 81*d*.

According to this configuration, in the waveguide filter device 8 according to the present embodiment, in the waveguide portion 80, the bandpass filter 81*d* and the higher-order mode suppressor 81*b* (corresponding to the higher-order mode suppressor 5) are used in combination. In this manner, even when the higher-order mode occurs in the frequency band of twice the cutoff frequency, the passage of the higher-order mode can be prevented by the higher-order mode suppressor 81*b*, and a situation where the transmission characteristics S21 are not sufficiently attenuated can be avoided. In this manner, the waveguide filter device 8 can perform a highly reliable bandpass filtering operation in a range of the frequency band exceeding the cutoff frequency and the frequency band of twice or more than the cutoff frequency.

In addition, the waveguide filter device 8 according to the present embodiment further includes the first coaxial waveguide converter 85*a* connected perpendicularly to the waveguide portion 80 in one end of the waveguide portion 80, accommodating the coaxial cable 86*a*, and performing the coaxial waveguide conversion with the waveguide path 80*a* in one end of the waveguide portion 80, and the second coaxial waveguide converter 85*b* connected perpendicularly to the waveguide portion 80 in the other end of the waveguide portion 80, accommodating the coaxial cable 86*b*, and performing the coaxial waveguide conversion with the waveguide path 80*a* in the other end of the waveguide portion 80. The waveguide portion 80, the first coaxial waveguide converter 85*a*, and the second coaxial waveguide converter 85*b* form the coaxial waveguide conversion device.

According to this configuration, the waveguide filter device 8 according to the present embodiment can be operated s the waveguide filter device including the coaxial waveguide conversion device having the higher-order mode suppression function, and is suitable for applications in the IF filter or the RF filter of devices such as the spectrum analyzer, the signal analyzer, the signal generation device, and the like.

As described above, according to the filter configuration method in the present embodiment, the first coaxial waveguide converter 85*a* is connected to one end of the waveguide portion 80, the second coaxial waveguide converter 85*b* is connected to the other end of the waveguide portion 80. In the waveguide portion 80, the first ridge-waveguide conversion unit 60*a*, the ridge waveguide portion 50, and the second ridge-waveguide conversion unit 60*b*, which are elements of the higher-order mode suppressor 5, are sequentially disposed in the longitudinal direction between the side of the first coaxial waveguide converter 85*a* and the side of the second coaxial waveguide converter 85*b*. The waveguide bandpass filter 81*d* is disposed in the tip (opposite side of the ridge waveguide portion 50) of at least one of the first ridge-waveguide conversion unit 60*a* and the second ridge-waveguide conversion unit 60*b*. Therefore, it is possible to easily provide the waveguide filter device 8 including the coaxial waveguide conversion device having the higher-order mode suppression function, which is suitable as the IF filter or the RF filter of devices such as the spectrum analyzer 1, the signal analyzer 2, the signal generation device 3, and the like.

(Spectrum Analyzer)

The waveguide filter system such as the waveguide filter device 8 (refer to FIG. 7) according to the above-described embodiment can be applied to the spectrum analyzer performing spectrum measurement, for example.

Figure 9:
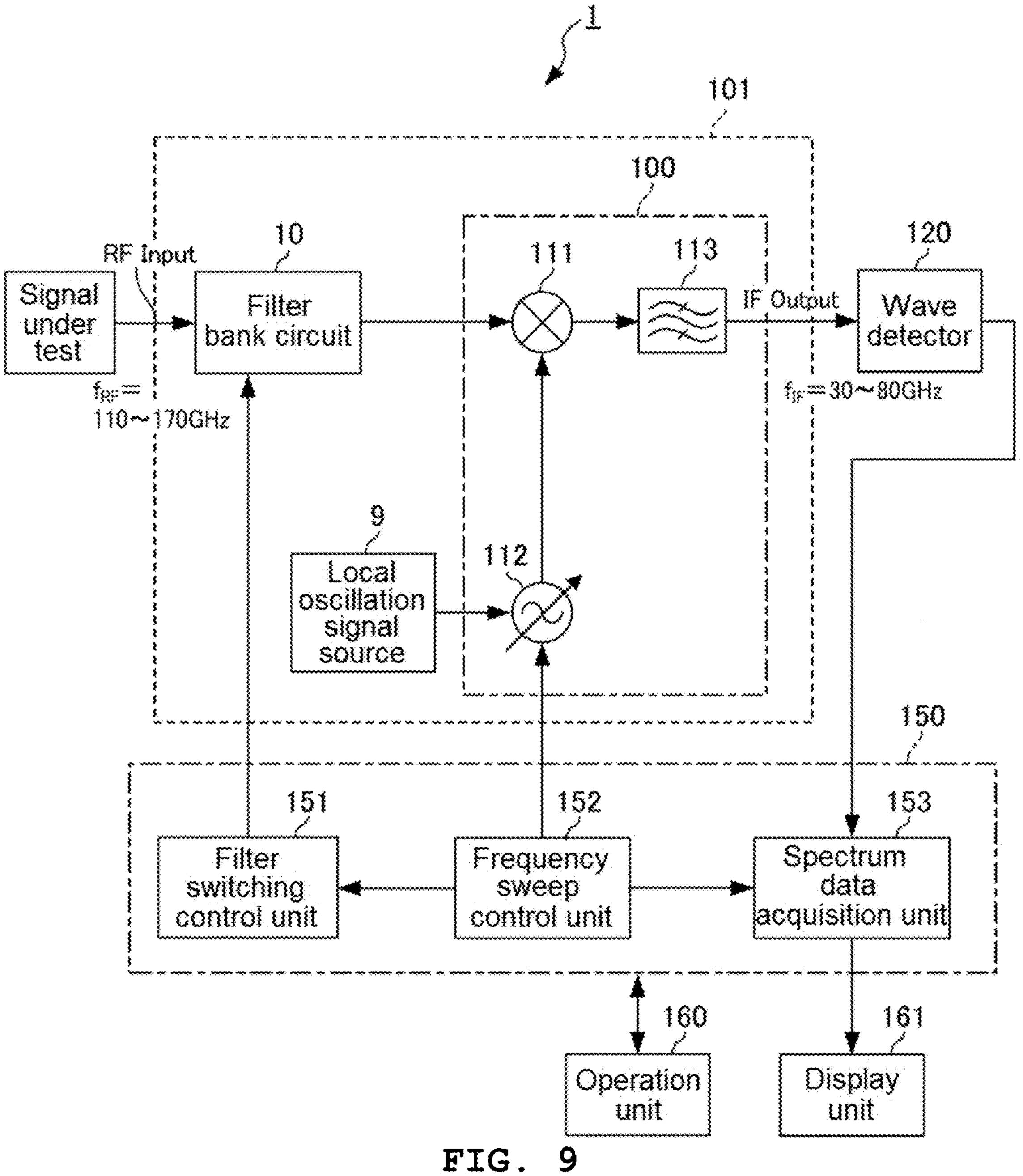
FIG. 9 is a view showing a configuration of a spectrum analyzer using the waveguide filter device according to the embodiment of the present invention as an IF filter.

FIG. 9 is a view showing a configuration of the spectrum analyzer 1 according to the embodiment of the present invention. The spectrum analyzer 1 is assumed to have a millimeter-wave band signal analysis function.

The spectrum analyzer 1 includes a frequency conversion unit 100, a wave detector 120, a control unit 150, an operation unit 160, and a display unit 161, and includes a filter bank circuit 10 in a front stage of the frequency conversion unit 100.

The frequency conversion unit 100 includes a mixer 111, a local signal generator 112, and a filter 113. The filter bank circuit 10 provided in the front stage of the mixer 111 forms a front end circuit 101 together with a local oscillation signal source 9, the mixer 111, the local signal generator 112, and the filter 113.

In the front end circuit 101, the filter bank circuit 10 has a plurality of filters and a changeover switch that selectively switches the filter allowing a signal in a desired frequency band to pass through, in the plurality of filters, and has configuration in which the filter switching control unit 151 can control the changeover switch to switch filter paths.

In the frequency conversion unit 100, the mixer 111 is a functional unit as frequency conversion means for converting the signal under test from the RF frequency to the signal (IF signal) of the IF frequency and outputting the converted signal by mixing the signal (RF frequency) of each frequency component in which a spurious wave output from the filter bank circuit 10 is suppressed, with the local signal input from the local signal generator 112.

The local signal generator 112 generates a local signal to be transmitted to the mixer 111, based on a local signal (reference signal) input from local oscillation signal source 9.

The filter 113 is a filter functional unit that inputs the IF signal subjected to frequency conversion by the mixer 111, allows only the signal of the frequency component in a preset band of the input IF signal to pass through, and inputs the signal to the wave detector 120. As the filter 113, a waveguide filter system having the higher-order mode suppression function such as the above-described waveguide filter device 8 (refer to FIG. 7) and the like is adopted.

The wave detector 120 is a processing circuit that detects intensity of the signal (IF) in each band, which passes through the filter 113 and is input.

The control unit 150 has a filter switching control unit 151, a frequency sweep control unit 152, and a spectrum data acquisition unit 153, in addition to a control function of integrally controlling the entire spectrum analyzer 1 including the filter bank circuit 10.

The filter switching control unit 151 electronically performs switching control on the changeover switch such that a filter path of the filter corresponding to a desired frequency is selected from the plurality of filters provided in the filter bank circuit 10.

The frequency sweep control unit 152 is a functional unit that performs frequency sweep control for changing the frequency of the local signal output from the local signal generator 112 to the mixer 111 within a designated frequency range, based on the local signal (reference signal) input from the local oscillation signal source 9.

The spectrum data acquisition unit 153 is a unit that acquires spectrum data including the intensity of the signal component in a desired frequency band within an analysis target frequency range detected by the wave detector 120, and performs display control or the like on the display unit 161.

The operation unit 160 has input means such as various keys, switches, buttons, and the like, and is operated by a user in a case of various settings relating to measurement of the signal under test. For example, the display unit 161 includes a liquid crystal display or the like, and is a functional unit that displays a setting screen, a measurement result, or the like relating to the measurement of the signal under test.

In the spectrum analyzer 1 shown in FIG. 9, the signal under test (input signal) in the millimeter-wave band is supplied to the mixer 111 of the frequency conversion unit 100 via the filter bank circuit 10, is mixed with the local signal output from the local signal generator 112, and a signal in a predetermined IF frequency band is extracted from the mixing output by the filter 113. The frequency of the local signal is swept and varied by the frequency sweep control unit 152 of the control unit 150 in correspondence with a desired analysis target frequency range. The signal component in the desired analysis target frequency range is extracted as the signal in the IF frequency band with the lapse of time, and the intensity of the signal is detected by the wave detector 120. In addition, in order to facilitate understanding of the description here, an example has been described in which frequency conversion processing (heterodyne conversion) of the frequency conversion unit 100 is performed only once. However, when a signal of the high frequency such as a millimeter-wave band is accurately analyzed, the frequency conversion processing is performed multiple times to convert the signal into the IF frequency band which enables digital processing.

In the control unit 150, for example, the spectrum data acquisition unit 153 stores the signal intensity detected by the wave detector 120 for each analysis target frequency, as spectrum data, in accordance with the analysis target frequency set by the operation unit 160, and displays the spectrum data on the display unit 161.

In this case, in accordance with the analysis target frequency, the filter switching control unit 151 performs the switching control on the changeover switch inside the filter bank circuit 10, and performs the switching control for switching to a filter having a pass band including the analysis target frequency.

In addition, in reply to the switching control of the filter switching control unit 151, the frequency sweep control unit 152 performs the sweep control on the frequency corresponding to the pass band of the filter selected in accordance with the analysis target frequency at that time.

In the configuration of the spectrum analyzer 1 shown in FIG. 9, for example, the signal under test (RF Input) as the input signal of the front end circuit 101 is a signal ($f_{RF}$) in a frequency range of 110 to 170 GHz, and for example, the signal under test (IF Output) as the output signal is a signal ($f_{IF}$) in a band of 30 to 80 GHz. That is, for example, the spectrum analyzer 1 according to the present embodiment receives reception signals from a mobile phone (5G, LTE, XG-PHS, W-CDMA, CDMA2000, GSM, or the like) or various types of wireless communication (WLAN, Bluetooth, GPS, ISDBT, or the like) as the input signal (RF Input), and can measure the spectrum characteristics of a desired frequency component after the spurious wave is suppressed by the filter bank circuit 10 inside the front end circuit 101.

In FIG. 9, the control unit 150 may be a control unit of a main body of the spectrum analyzer 1, or may have a configuration in which a device such as a personal computer (PC) and the like is separately provided.

Next, a signal measurement control operation in the spectrum analyzer 1 according to the present embodiment will be described with reference to a flowchart shown in FIG. 10.

In this example, for example, the spectrum analyzer 1 performs a measurement operation as follows. The signal under test in a millimeter-wave band (110 to 170 GHz band) is input. A signal in a preset desired frequency band is extracted from the signal under test by a corresponding filter in the plurality of filters in the filter bank circuit 10. The extracted frequency component is converted into the IF frequency, and thereafter, is input to the wave detector 120. The frequency spectrum is measured, and a measurement result thereof is displayed on the display unit 161.

In order to perform the measurement operation, for example, a user performs an operation for setting a sweep frequency range (analysis target frequency range) of the spectrum analyzer 1 in the operation unit 160 (Step S1). For example, parameters to be set here include a center frequency and a sweep frequency span, a start frequency and a stop frequency, and a start frequency and a sweep frequency span.

Next, the control unit 150 calculates a filter to be selected and LO setting (setting condition of the local frequency) from the sweep frequency range set in Step S1 (Step S2).

Subsequently, the control unit 150 sets the path of the changeover switch which corresponds to the path of the above-described filter to be selected, and sets the local frequency (LO frequency) (Step S3).

Next, in the control unit 150, the filter switching control unit 151 performs the switching control on the changeover switch, based on the path setting in Step S41, and in response thereto, the frequency sweep control unit 152 controls the frequency sweep for the local signal generator 112, based on the LO setting in Step S41 (Step S4).

In response to the above-described sweep control, in the control unit 150, the filter 113 performs filtering on the IF signal from the mixer 111, and outputs the filtered signal to the wave detector 120 (Step S5).

The control unit 150 transmits a detection result of the wave detector 120 to the spectrum data acquisition unit 153, and performs the measurement in the filter selected in Step S3 described above (Step S6).

Figure 10:
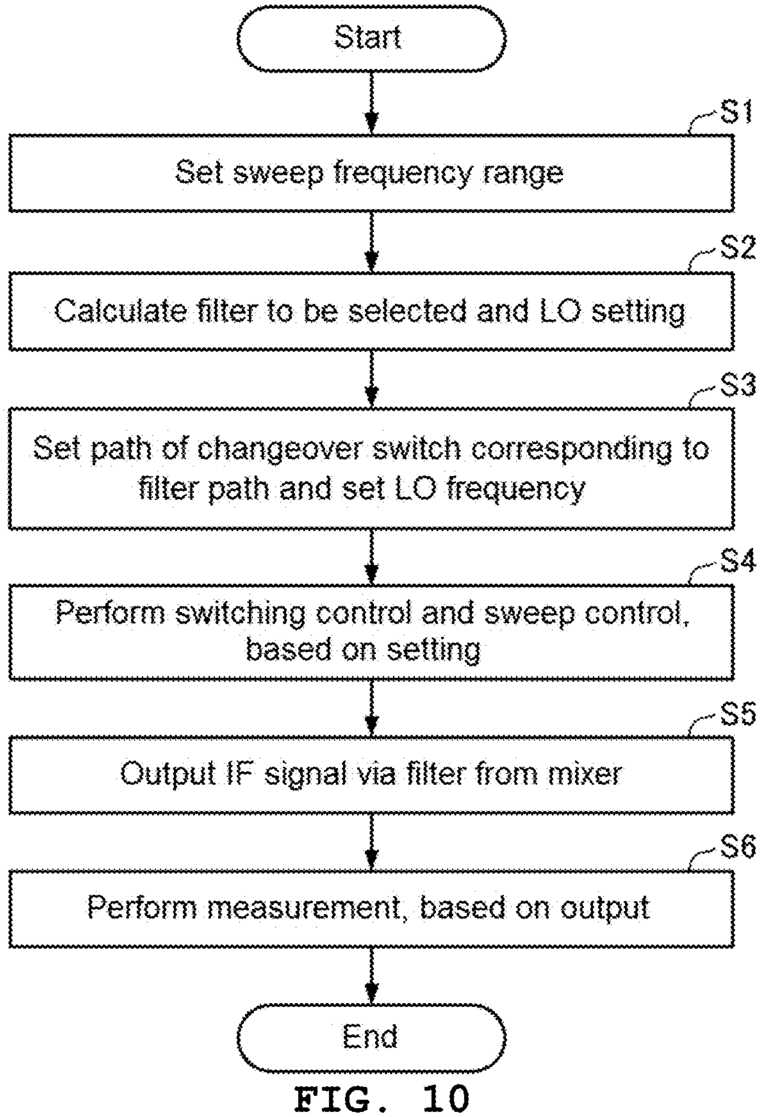
FIG. 10 is a flowchart showing a spectrum characteristic measurement operation in a spectrum analyzer using the waveguide filter device according to the embodiment of the present invention as the IF filter.

In Step S5, during a series of measurement processing operations shown in FIG. 10, filtering processing in which the occurrence of the higher-order mode is suppressed by the filter 113 including the waveguide filter device 8 (refer to FIG. 7) is performed.

Specifically, in the spectrum analyzer 1, for example, a signal of the frequency extracted by the filter bank circuit 10 in the input signal (signal under test) of 110 to 170 GHz is mixed with the local signal from the local oscillation signal source 9 by the mixer 111 in the frequency conversion unit 110, is converted into the IF frequency, and is input to the filter 113.

Here, for example, the above-described waveguide filter device 8 (refer to FIG. 7) is adopted as the filter 113. In this case, for example, whereas the filter 113 allows the IF signal in the frequency band of 30 to 50 GHz to pass through, and transmits the IF signal to the wave detector 120, the filter 113 stops the passage of the other frequency band (including 60 to 80 GHZ) occurring in a mixing process. In short, in the filter 113 adopting the waveguide filter device 8, the pass band of the bandpass filter 81*d* is not changed from the related art by the higher-order mode suppressor 5 used in combination with the bandpass filter 81*d*. However, the stopband can be widened to the high frequency band of twice or more than the cutoff frequency.

In this manner, the spectrum analyzer 1 according to the present embodiment can widen the stopband to the high frequency band of twice or more than the cutoff frequency by preventing the passage of the higher-order mode while allowing the preset pass band to pass through, without being combined with the higher-order mode suppression function, as the filter 113, compared to the configuration in the related art in which the bandpass filter is simply used. Therefore, in the spectrum analyzer 1 according to the present embodiment, the passage of the unnecessary frequency signal which is caused by the occurrence of the higher-order mode is suppressed, and the stopband is widened. In this manner, highly reliable measurement of the spectrum characteristics in the millimeter-wave band or the higher frequency band can be realized.

In this way, the spectrum analyzer 1 according to the present embodiment has a configuration as follows. The waveguide filter system (waveguide filter device 8 (refer to FIG. 7)) including the waveguide portion 80 including the bandpass filter 81*d* (refer to FIG. 7 in which a predetermined pass band is set and the higher-order mode suppressor 5 (refer to FIG. 1) is mounted as the filter 113 extracting a predetermined IF signal from the mixing output of the signal under test (RF signal exceeding 110 GHZ) and the local signal. While the waveguide portion 80 inputs the mixing output and allows the frequency band corresponding to the pass band of the bandpass filter 81*d* to pass through, the higher-order mode suppressor 5 prevents the passage of the higher-order mode occurring in the high frequency band of twice or more than the cutoff frequency.

According to this configuration, in the spectrum analyzer 1 according to the present embodiment, while the filter 113 extracting the IF signal allows the frequency band corresponding to the pass band of the bandpass filter 81*d* to pass through, the filter 113 can widen the stopband to the high frequency band of twice or more than the cutoff frequency. The filter 113 can measure the highly reliable spectrum characteristics (unnecessary component is not displayed) for the millimeter-wave band or the higher frequency band in the future as a target.

(Signal Analyzer)

The waveguide filter device 8 (refer to FIG. 7) according to the above-described embodiment is not limited to the spectrum analyzer 1 shown in FIG. 9, and can also be applied to the signal analyzer that analyzes a signal in a predetermined frequency band.

Figure 11:
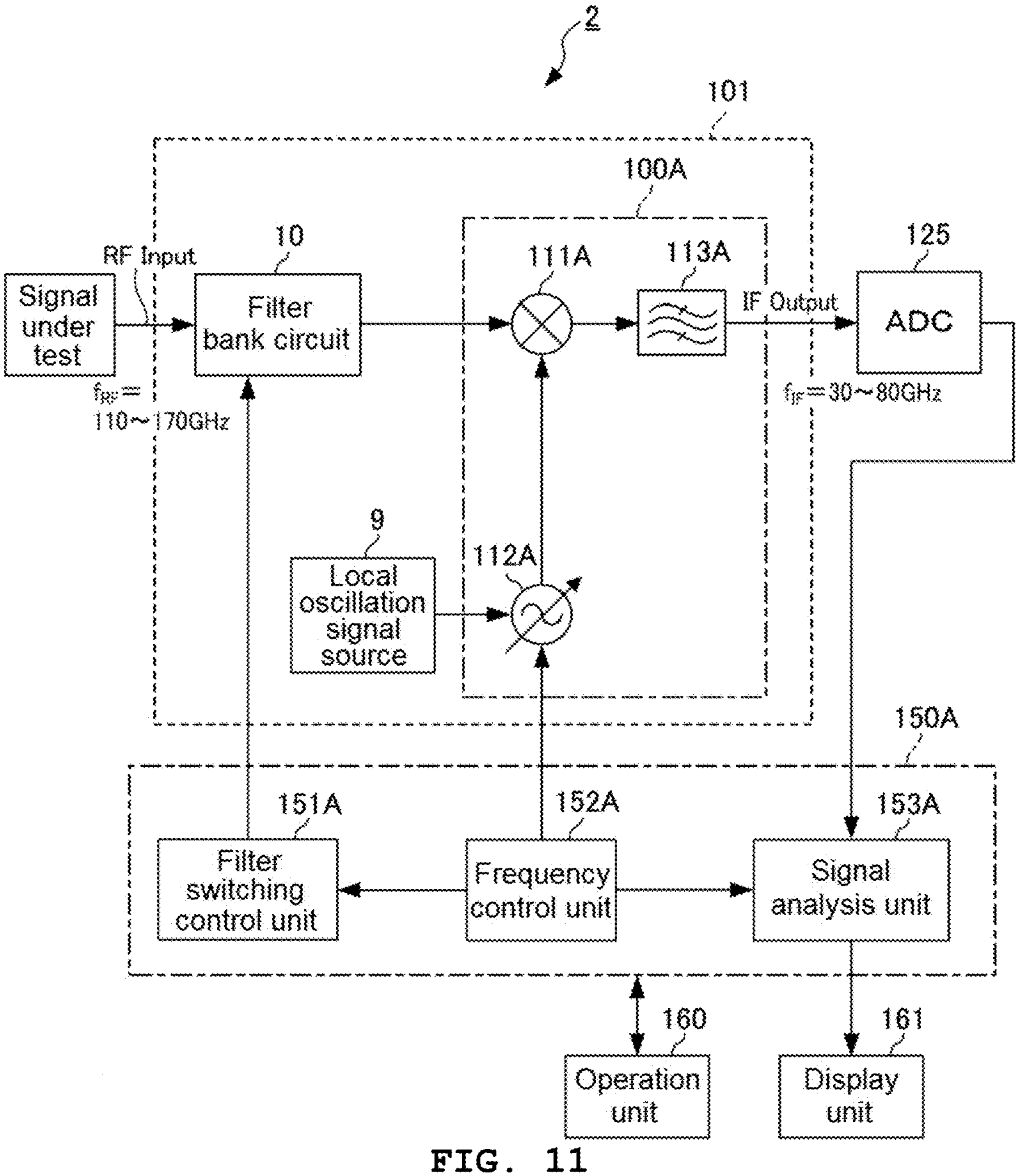
FIG. 11 is a view showing a configuration of a signal analyzer using the waveguide filter device according to the embodiment of the present invention as the IF filter.

FIG. 11 is a view showing a configuration of the signal analyzer 2 according to the embodiment of the present invention. The signal analyzer 2 includes a frequency conversion unit 100A, an analog to digital converter (ADC) 125, a control unit 150A, an operation unit 160, and a display unit 161, and includes the filter bank circuit 10 equivalent to the spectrum analyzer 1 in a front stage of the frequency conversion unit 100A. The filter bank circuit 10 forms the front end circuit 101 together with the local oscillation signal source 9 and the frequency conversion unit 100.

In the front end circuit 101, the frequency conversion unit 100A includes a mixer 111A, a local signal generator 112A, and a filter 113A.

The mixer 111A mixes the signal (RF frequency) of each frequency component in which the spurious wave output from the filter bank circuit 10 is suppressed, with the local signal input from the local signal generator 112A, converts the signal under test from the signal of the RF frequency to the signal of the IF frequency, and outputs the converted signal.

The local signal generator 112A generates the local signal to be transmitted to the mixer 111A, based on the local signal (reference signal) input from local oscillation signal source 9.

The filter 113A is a filter functional unit that inputs the IF signal subjected to frequency conversion by the mixer 111A, allows only the signal of the frequency component in a preset band of the input IF signal to pass through, and inputs the signal to the ADC 125. Here, an overlapping band is set such that the signal (signal under test) of the frequency component in the preset band of the IF signal is not omitted in the filter bank circuit 10. That is, the overlapping band needs to allow the band wider than the IF band signal to pass through.

The ADC 125 converts the signal (signal under test) passing through the filter bank circuit 10 and subjected to frequency conversion by the frequency conversion unit 100A from an analog signal into a digital signal.

The control unit 150A includes a filter switching control unit 151A, a frequency control unit 152A, and a signal analysis unit 153A. The filter switching control unit 151A is equivalent to the control unit 150 provided in the spectrum analyzer 1 (refer to FIG. 8).

The frequency control unit 152A performs control for setting the local frequency such that a signal in the analysis target frequency range designated when the frequency conversion unit 100A converts the frequency of the signal under test can be received. The local signal generator 112A forming the frequency conversion unit 100A has a configuration in which the local frequency is variable in accordance with the received RF frequency. Therefore, the frequency control unit 152A may control the local signal generator 112A, and may perform the sweep control on the local frequency.

The signal analysis unit 153A performs processing of analyzing the waveform of the signal (signal under test) converted into the digital signal by the ADC 125, specifically, processing of generating a modulation analysis result by analyzing waveform analysis data or a modulation signal for performing a waveform display such as a spectrum and the like on the above-described digital signal.

In the signal analyzer 2 having the above-described configuration, in order to perform the analysis processing of the signal, for example, the analysis target frequency is set by a predetermined setting operation on the operation unit 160. This processing corresponds to processing in Step S1 (refer to FIG. 10) in the spectrum analyzer 1.

Next, the control unit 150A performs processing of calculating the filter to be selected inside the filter bank circuit 10, based on the set analysis target frequency. This processing corresponds to processing in Step S2 (refer to FIG. 10) in the spectrum analyzer 1.

Subsequently, the control unit 150A sets the path of the changeover switch calculated in the above-described calculation processing and corresponding to the filter to be selected, and next, the filter switching control unit 151A performs the switching control on the changeover switch to select the filter to be selected. This processing corresponds to the processing in Step S3 and a portion of the processing (excluding the sweep control) in Step S4 in the spectrum analyzer 1.

In this manner, in the filter bank circuit 10, the input signal under test passes through the filter switched by the switching control and calculated by the calculation processing, and is output. The frequency component passing through the filter is input as an analysis target to the frequency conversion unit 100A.

In the frequency conversion unit 100A, the frequency component (signal under test) input from the filter bank circuit 10 and the local signal input from the local signal generator 112A are mixed by the mixer 111A, and are converted into the IF frequency band. A signal in a predetermined IF frequency band is extracted from the mixing output by the filter 113A, and the extracted signal is transmitted to the ADC 125. This processing corresponds to the processing in Step S5 (refer to FIG. 10) in the spectrum analyzer 1.

The ADC 125 converts the signal subjected to frequency conversion from the analog signal to the digital signal, and inputs the digital signal to the signal analysis unit 153A. The signal analysis unit 153A performs processing of generating a modulation analysis result by analyzing waveform analysis data or a modulation signal for performing a waveform display such as a spectrum and the like on the digital signal, from the digital signal input from the ADC 125. Furthermore, the control unit 150A performs control for signal analysis, such as displaying the waveform analysis data generated by the signal analysis unit 153A on the display unit 161.

In this way, the signal analyzer 2 according to the present embodiment includes the frequency conversion unit 100A having the filter 113A for supplying the signal under test having a predetermined frequency component together with the local signal output from the local signal generator 112A to the mixer 111A and extracting the signal in a predetermined IF frequency band from the mixing output, and the signal analysis unit 153A that analyzes a waveform of the signal after converting the signal in the IF frequency band into the digital signal by using the ADC 125, and analyzes the waveform of the signal under test by changing the frequency of the local signal in accordance with the analysis target frequency.

Here, for example, the above-described waveguide filter device 8 (refer to FIG. 7) is adopted as the filter 113A of the frequency conversion unit 100A. In this case, for example, whereas the filter 113A allows the IF signal in the frequency band of 30 to 50 GHz to pass through, and transmits the IF signal to the ADC 125, the filter 113A stops the passage of the other frequency band (including 60 to 80 GHz) occurring in the mixing process. In short, in the filter 113A adopting the waveguide filter device 8, the pass band of the bandpass filter 81*d* is not changed from the related art by the higher-order mode suppressor 5 used in combination with the bandpass filter 81*d*. However, the stopband can be widened to the high frequency band of twice or more than the cutoff frequency.

In this manner, the signal analyzer 2 according to the present embodiment can widen the stopband to the high frequency band of twice or more than the cutoff frequency by preventing the passage of the higher-order mode while allowing the preset pass band to pass through, without being combined with the higher-order mode suppression function, as the filter 113A, compared to the configuration in the related art in which the bandpass filter is simply used. Therefore, in the signal analyzer 2 according to the present embodiment, the passage of the unnecessary frequency signal which is caused by the occurrence of the higher-order mode is suppressed, and the stopband is widened. In this manner, highly reliable signal analysis in the millimeter-wave band or the higher frequency band can be realized.

In this way, the signal analyzer 2 according to the present embodiment has a configuration as follows. The waveguide filter device 8 (refer to FIG. 7) including the waveguide portion 80 including the bandpass filter 81*d* (refer to FIG. 7) in which a predetermined pass band is set and the higher-order mode suppressor 5 (refer to FIG. 1) is used as the filter 113A extracting a predetermined IF signal from the mixing output of the signal under test (RF signal exceeding 110 GHz) and the local signal. While the waveguide portion 80 inputs the mixing output and allows the frequency band corresponding to the pass band of the bandpass filter 81*d* to pass through, the higher-order mode suppressor prevents the passage of the higher-order mode occurring in the high frequency band of twice or more than the cutoff frequency.

According to this configuration, in the signal analyzer 2 according to the present embodiment, in the filter 113A extracting the IF signal, while the frequency band corresponding to the pass band of the bandpass filter 81*d* is allowed to pass through, the stopband can be widened to the high frequency band of twice or more than the cutoff frequency. Highly reliable signal analysis (unnecessary component is not displayed) can be performed on a millimeter-wave band or a higher frequency band as a target.

(Signal Generation Device)

The waveguide filter system such as the waveguide filter device 8 (refer to FIG. 7) according to the above-described embodiment is not limited to the spectrum analyzer 1 and the signal analyzer 2, and can be mounted on the signal generation device that generates a test signal of the DUT.

Figure 12:
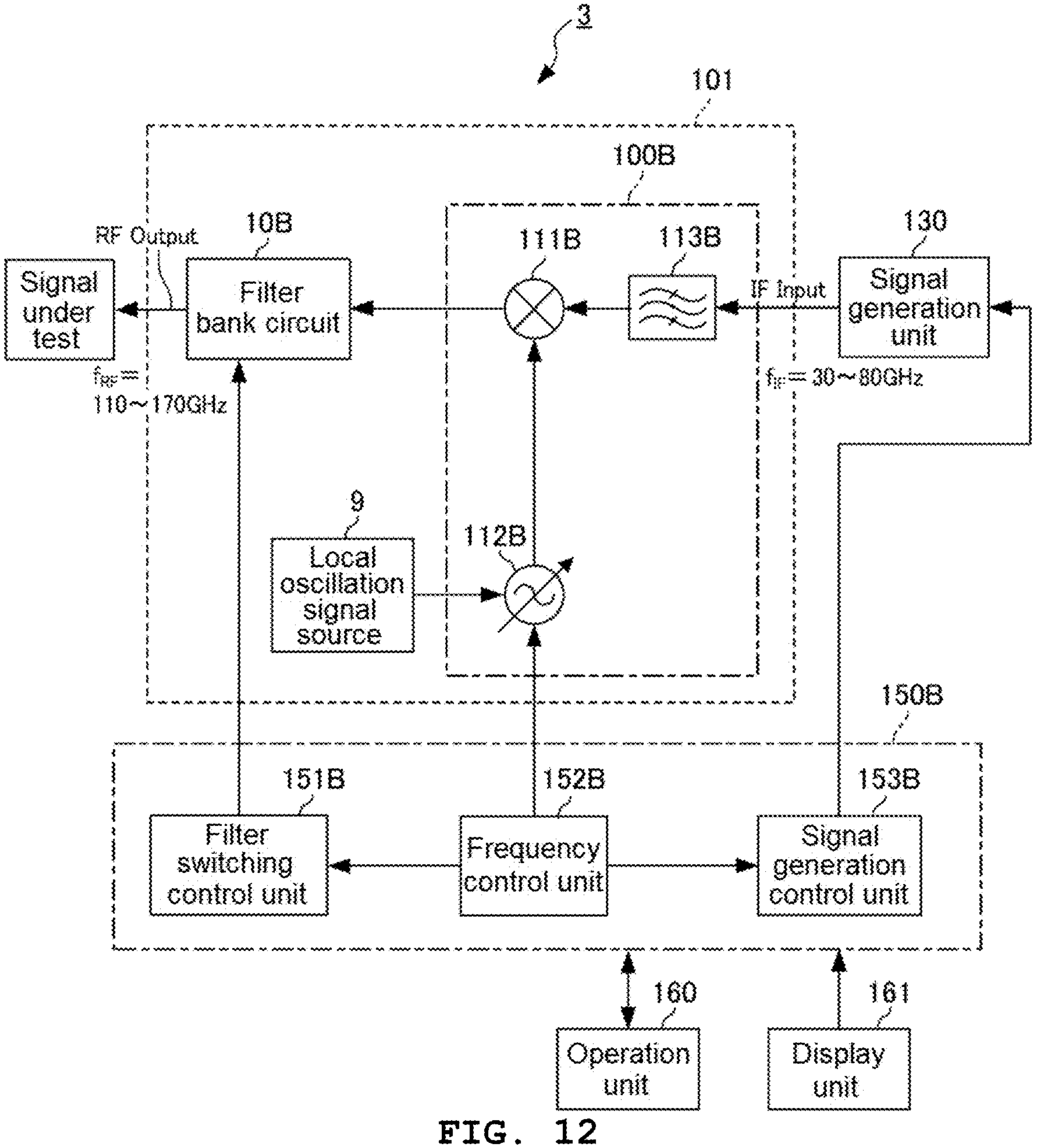
FIG. 12 is a view showing a configuration of a signal generation device using the waveguide filter device according to the embodiment of the present invention as the IF filter.

FIG. 12 is a view showing a configuration of the signal generation device 3 according to an embodiment of the present invention. The signal generation device 3 is assumed to be a test signal generation device that generates a test signal for testing reception sensitivity of a millimeter-wave band signal for the DUT.

The signal generation device 3 includes a filter bank circuit 10B provided in a rear stage of the frequency conversion unit 100B, in addition to the frequency conversion unit 100B, the signal generation unit 130, the control unit 150B, the operation unit 160, and the display unit 161. The filter bank circuit 10B forms the front end circuit 101 together with the local oscillation signal source 9 and the frequency conversion unit 100B.

In the front end circuit 101, the frequency conversion unit 100B includes a mixer 111B, a local signal generator 112B, and a filter 113B. The control unit 150B includes a filter switching control unit 151B, a frequency control unit 152B, and a signal generation control unit 153B.

In the signal generation device 3, a test signal in the IF frequency band output from the signal generation unit 130 is input to the frequency conversion unit 100B under the control of the signal generation control unit 153B. The frequency conversion unit 100B performs processing of converting the input test signal into a millimeter-wave band signal by causing the filter 113B to perform filtering processing on the test signal and supplying the test signal to the mixer 111B together with the local signal output from the local signal generator 112B. As the filter 113B, the waveguide filter system having the higher-order mode suppression function, such as the above-described waveguide filter device 8 (refer to FIG. 7), is adopted.

When processing of converting the test signal subjected to filtering processing by the filter 113B as described above into a millimeter-wave band signal is performed, the frequency conversion unit 100B causes the frequency control unit 152B to change the frequency of the local signal, for example, in accordance with the test target frequency set to test the DUT by the operation unit 160, the frequency conversion unit 100B transmits the signal subjected to frequency conversion to the filter bank circuit 10B in the rear stage, as the test signal of the DUT.

As the filter bank circuit 10B, those which are equivalent to the filter bank circuit 10 mounted on the spectrum analyzer 1 and the signal analyzer 2 according to the above-described embodiment can be used.

In the test of the DUT using the signal generation device 3, after the test target frequency is set by the operation unit 160, the test signal satisfying the setting condition generated from the signal generation unit 130 is subjected to frequency conversion into the RF signal by the frequency conversion unit 100B under the control of the signal generation control unit 153B, and thereafter, is input to the input unit of the changeover switch in the filter bank circuit 10B.

In this case, the filter switching control unit 151B of the control unit 150B performs the switching control on the changeover switch to which the signal subjected to frequency conversion is input, in accordance with the set test target frequency. According to the switching control, the path of the filter corresponding to the test target frequency is selected, and the signal subjected to frequency conversion passes through the filter having the corresponding pass band, and is extracted as the test signal. The extracted test signal is transmitted from an RF transmission unit (not shown) toward the DUT.

Figure 13:
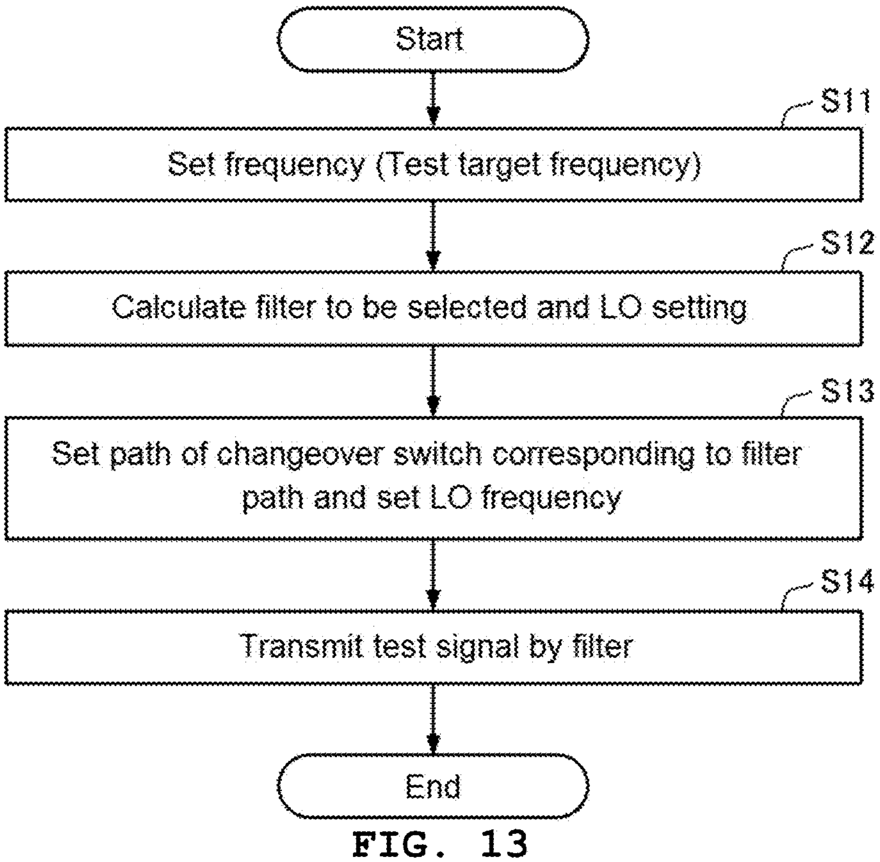
FIG. 13 is a flowchart showing a signal transmission control operation in the signal generation device using the waveguide filter device according to the embodiment of the present invention as the IF filter.

A signal transmission control operation in the signal generation device 3 which relates to the test of the above-described DUT is performed in accordance with a flowchart shown in FIG. 13. In order to perform the signal transmission control in the signal generation device 3 which relates to the test of the DUT, for example, the frequency, that is, the test target frequency is set by a predetermined setting operation in the operation unit 160 (Step S11).

Next, the control unit 150B calculates the filter to be selected inside the filter bank circuit 10B and the setting condition of the local frequency (LO setting), based on the set test target frequency (Step S12).

Subsequently, the control unit 150B sets the path of the changeover switch calculated in Step S12 and corresponding to the filter to be selected, and the filter switching control unit 151B performs the switching control on the changeover switch to select the filter to be selected (Step S13).

In this manner, in the filter bank circuit 10B, the test signal input to the changeover switch passes through the filter switched by the above-described switching control (calculated by the above-described calculation processing), and is output from the output unit of the changeover switch. The control unit 150B controls the signal of the frequency component output from the output unit of the changeover switch to be transmitted as the test signal (Step S14).

In this way, the signal generation device 3 according to the present embodiment includes the frequency conversion unit 100B that converts the test signal in the IF frequency band output from the signal generation unit 130 into the millimeter-wave band signal by causing the filter 113B to perform filtering processing on the test signal and supplying the test signal to the mixer 111B together with the local signal output from the local signal generator 112B, changes the frequency of the local signal in accordance with the test target frequency for testing the DUT, and transmits the signal subjected to frequency conversion performed by the frequency conversion unit 100B, as the test signal of the DUT.

During the above-described test signal transmission processing operation, the frequency conversion unit 100B performs filtering processing in which the occurrence of the higher-order mode with respect to the input signal (test signal) is suppressed by the filter 113B including the above-described waveguide filter device 8 (refer to FIG. 7).

More specifically, in the signal generation device 3, for example, the IF signal (IF input) in the frequency band required for transmitting the test signal of 110 to 170 GHZ as the RF signal (RF output) is input to the frequency conversion unit 100B. In the frequency conversion unit 100B, the filter 113B performs filtering processing on the input signal (IF signal), and further, the mixer 111B mixes the filtered signal with the local signal from the local signal generator 112B, and the mixed signal is converted into the RF signal to transmits the RF signal.

Here, for example, the above-described waveguide filter device 8 (refer to FIG. 7) is adopted as the filter 113B. In this case, for example, whereas the filter 113B allows the IF signal in the frequency band of 30 to 50 GHz to pass through, and transmits the IF signal to the mixer 111B, the filter 113B stops the passage of the other frequency band (including 60 to 80 GHZ). In short, in the filter 113B adopting the waveguide filter device 8, the pass band of the bandpass filter 81*d* is not changed from the related art by the higher-order mode suppressor 5 used in combination with the bandpass filter 81*d*. However, the stopband can be widened to the high frequency band of twice or more than the cutoff frequency.

In this manner, the signal generation device 3 according to the present embodiment can widen the stopband to the high frequency band of twice or more than the cutoff frequency by preventing the passage of the higher-order mode while allowing the preset pass band to pass through, without being combined with the higher-order mode suppression function, as the filter 113B, compared to the configuration in the related art in which the bandpass filter is simply used. Therefore, in the signal generation device 3 according to the present embodiment, the passage of the unnecessary frequency signal which is caused by the occurrence of the higher-order mode is suppressed, and the stopband is widened. In this manner, highly reliable test signal transmission function corresponding to the frequency band of the millimeter-wave band or the higher frequency band can be realized.

In this way, the signal generation device 3 according to the present embodiment has a configuration as follows. The waveguide filter device (refer to FIG. 7) including the waveguide portion 80 including the bandpass filter 81*d* (refer to FIG. 7) in which a predetermined pass band is set and the higher-order mode suppressor 5 (refer to FIG. 1) is used as the filter 113B extracting a signal in a predetermined IF frequency band from the test signal output from the signal generation unit 130. While the waveguide portion 80 inputs the output from the signal generation unit 130 and allows the frequency band corresponding to the pass band of the bandpass filter 81*d* to pass through, the higher-order mode suppressor 5 prevents the passage of the higher-order mode occurring in the high frequency band of twice or more than the cutoff frequency.

According to this configuration, in the signal generation device 3 according to the present embodiment, in the filter 113B extracting the IF signal, while the frequency band corresponding to the pass band of the bandpass filter 81*d* is allowed to pass through, the stopband can be widened to the high frequency band of twice or more than the cutoff frequency. A highly reliable test signal (unnecessary components are not attenuated) in the frequency band of a millimeter-wave band or a higher frequency band can be transmitted, and test quality of the DUT can be improved.

INDUSTRIAL APPLICABILITY

As described above, the present invention can reliably prevent passage of an occurring higher-order mode with a simple structure, and can achieve advantageous effects in that highly reliable spectrum measurement, signal analysis, and signal generation which are not affected by the higher-order mode, by applying the structure, and the present invention is useful for a higher-order mode suppressor, a waveguide filter device using the same, a spectrum analyzer, a signal analyzer, a signal generation device, a higher-order mode suppression control method, and a filter configuration method.

DESCRIPTION OF REFERENCE NUMERALS AND SIGNS

1: Spectrum analyzer
2: Signal analyzer
3: Signal generation device
5: Higher-order mode suppressor
8: Waveguide filter device
9: Local oscillation signal source
10, 10B: Filter bank circuit
50: Ridge waveguide portion
51: Waveguide path
51*a*: Upper surface (inner surface)
51*b*: Lower surface (inner surface)
52*a*, 52*b*, 62*a*1, 62*a*2, 62*b*1, 62*b*2: Ridge portion
53*a*: One end surface
53*b*: Other end surface
60*a*: Ridge-waveguide conversion unit (first ridge-waveguide conversion unit)
60*b*: Ridge-waveguide conversion unit (second ridge-waveguide conversion unit)
61*a*, 61*b*: Ridge-waveguide converting waveguide path
61*a*1, 61*b*1: Upper surface
61*a*2, 61*b*2: Lower surface
63*a*, 63*b*, 64*a*, 64*b*: End surface
70*a*: Waveguide (first waveguide)
70*b*: Waveguide (second waveguide)
71*a*, 71*b*: Waveguide path
72*a*, 72*b*, 73*a*, 73*b*: End surface
80: Waveguide portion
80*a*: Waveguide path
81*a*, 81*c*, 81*e*: Waveguide
81*b*: Higher-order mode suppressor
81*d*: Waveguide bandpass filter
85*a*: Coaxial waveguide converter (first coaxial waveguide converter)
85*b*: Coaxial waveguide converter (second coaxial waveguide converter)
86*a*, 86*b*: Coaxial cable
100, 100A, 100B: Frequency conversion unit
101: Front end circuit
111, 111A, 111B: Mixer
112, 112A, 112B: Local signal generator
113, 113A, 113B: Filter
120: Wave detector
125: ADC
130: Signal generation unit
150, 150A, 150B: Control unit
151, 151A, 151B: Filter switching control unit
152: Frequency sweep control unit
152A, 152B: Frequency control unit
153: Spectrum data acquisition unit
153A: Signal analysis unit
153B: Signal generation control unit
160: Operation unit
161: Display unit

What is claimed is:

1. A higher-order mode suppressor provided between a first waveguide and a second waveguide, the higher-order mode suppressor comprising:

a ridge waveguide portion having a ridge structure in which a waveguide path penetrating in a longitudinal direction is provided and ridge portions are formed inside the waveguide path;

a first ridge-waveguide conversion unit connected to one end surface of the ridge waveguide portion in a longitudinal direction and forming a ridge-waveguide converting waveguide path performing relay of radio wave propagation between the waveguide path having the ridge structure and a waveguide path of the first waveguide, between an end surface facing the one end surface and an opposite side end surface; and a second ridge-waveguide conversion unit connected to the other end surface of the ridge waveguide portion in the longitudinal direction and forming a ridge-waveguide converting waveguide path performing relay of radio wave propagation between the waveguide path having the ridge structure and a waveguide path of the second waveguide, between an end surface facing the other end surface and an opposite side end surface, wherein in the ridge waveguide portion, an inner diameter of the waveguide path is narrower than inner diameters of the waveguide paths of the first waveguide and the second waveguide, wherein the first waveguide and the second waveguide are respectively connected to the opposite side end surface of the first ridge-waveguide conversion unit and the opposite side end surface of the second ridge-waveguide conversion unit, wherein when one of the first waveguide and the second waveguide is set as an input side and the other is set as an output side, and a frequency band exceeding a basic frequency band is input from the input side, the ridge waveguide portion is configured with dimensions for suppressing a higher-order mode occurring on the input side with respect to a frequency band of twice or more than a cutoff frequency band, and wherein the ridge waveguide portion has a double ridge structure in which the ridge portion protrudes toward an inside of the waveguide path from inner surfaces facing each other in the waveguide path.

2. The higher-order mode suppressor according to claim 1, wherein a waveguide conforming to a predetermined waveguide standard is connected as the first waveguide and the second waveguide, and the ridge waveguide portion is configured with dimensions such that the inner diameter of the waveguide path suppresses a TE20 mode up to a desired frequency.

3. The higher-order mode suppressor according to claim 1, wherein inside the ridge-waveguide converting waveguide path of each of the first ridge-waveguide conversion unit and the second ridge-waveguide conversion unit, tapered ridge portions having heights gradually changing to be lower from an end surface facing the one end surface of the ridge waveguide portion to the opposite side end surface, and from an end surface facing the other end surface of the ridge waveguide portion to the opposite side end surface are further formed.

4. The higher-order mode suppressor according to claim 3, wherein the ridge-waveguide converting waveguide path of each of the first ridge-waveguide conversion unit and the second ridge-waveguide conversion unit is configured to include a tapered waveguide path having an opening dimension continuously increasing from the end surface facing the one end surface of the ridge waveguide portion to the opposite side end surface, and from the end surface facing the other end surface of the ridge waveguide portion to the opposite side end surface.

5. A waveguide filter device comprising:

a higher-order mode suppressor provided between a first waveguide and a second waveguide, the higher-order mode suppressor comprising:

a ridge waveguide portion having a ridge structure in which a waveguide path penetrating in a longitudinal direction is provided and ridge portions are formed inside the waveguide path;

a first ridge-waveguide conversion unit connected to one end surface of the ridge waveguide portion in a longitudinal direction and forming a ridge-waveguide converting waveguide path performing relay of radio wave propagation between the waveguide path having the ridge structure and a waveguide path of the first waveguide, between an end surface facing the one end surface and an opposite side end surface; and a second ridge-waveguide conversion unit connected to the other end surface of the ridge waveguide portion in the longitudinal direction and forming a ridge-waveguide converting waveguide path performing relay of radio wave propagation between the waveguide path having the ridge structure and a waveguide path of the second waveguide, between an end surface facing the other end surface and an opposite side end surface, wherein in the ridge waveguide portion, an inner diameter of the waveguide path is narrower than inner diameters of the waveguide paths of the first waveguide and the second waveguide, wherein the first waveguide and the second waveguide are respectively connected to the opposite side end surface of the first ridge-waveguide conversion unit and the opposite side end surface of the second ridge-waveguide conversion unit, and wherein when one of the first waveguide and the second waveguide is set as an input side and the other is set as an output side, and a frequency band exceeding a basic frequency band is input from the input side, the ridge waveguide portion is configured with dimensions for suppressing a higher-order mode occurring on the input side with respect to a frequency band of twice or more than a cutoff frequency band; and a waveguide portion including at least a waveguide bandpass filter in which a predetermined pass band is set, as a configuration element, and in which a plurality of the configuration elements are continuously connected in a longitudinal direction to form one waveguide path, wherein when one end of the waveguide portion is set as the input side and the other end is set as the output side, and a filtering operation is performed in the waveguide portion exceeding a basic frequency band input from the input side, the higher-order mode occurring on the input side with respect to a frequency band of twice or more than a cutoff frequency of the waveguide bandpass filter is suppressed by the higher-order mode suppressor, and is attenuated before reaching the waveguide bandpass filter.

6. The waveguide filter device according to claim 5, further comprising:

a first coaxial waveguide converter connected perpendicularly to the waveguide portion in the one end of the waveguide portion, accommodating a coaxial cable, and performing coaxial waveguide conversion with the waveguide path in the one end of the waveguide portion; and a second coaxial waveguide converter connected perpendicularly to the waveguide portion in the other end of the waveguide portion, accommodating a coaxial cable, and performing coaxial waveguide conversion with the waveguide path in the other end of the waveguide portion, wherein the waveguide portion, the first coaxial waveguide converter, and the second coaxial waveguide converter form a coaxial waveguide conversion device.

7. A spectrum analyzer comprising:

a frequency conversion unit including a filter supplying a signal under test having a predetermined frequency component together with a local signal output from a local signal generator to a mixer and extracting a signal in a predetermined intermediate frequency band from a mixing output; and a wave detector detecting the signal in the intermediate frequency band, the spectrum analyzer obtaining spectrum characteristics of the signal under test by changing a frequency of the local signal in accordance with an analysis target frequency, wherein the waveguide filter device according to claim 6 is used for the filter, and the waveguide portion of the waveguide filter device inputs the mixing output, allows a frequency band corresponding to a pass band of the waveguide bandpass filter to pass through, and suppresses a higher-order mode occurring in a high frequency band of twice or more than a cutoff frequency by the higher-order mode suppressor.

8. A signal analyzer comprising:

a frequency conversion unit including a filter supplying a signal under test having a predetermined frequency component together with a local signal output from a local signal generator to a mixer and extracting a signal in a predetermined intermediate frequency band from a mixing output; and a signal analysis unit analyzing a waveform of the digital signal after the signal in the intermediate frequency band is converted into a digital signal by using an ADC, wherein the signal analyzer analyzes a waveform of the signal under test by changing a frequency of the local signal in accordance with an analysis target frequency, the waveguide filter device according to claim 6 is used for the filter, and the waveguide portion of the waveguide filter device inputs the mixing output, allows a frequency band corresponding to a pass band of the waveguide bandpass filter to pass through, and suppresses a higher-order mode occurring in a high frequency band of twice or more than a cutoff frequency by the higher-order mode suppressor.

9. A signal generation device comprising:

a frequency conversion unit allowing a test signal in an intermediate frequency band output from a signal generation unit into a millimeter-wave band signal to pass through a filter extracting a signal in a predetermined intermediate frequency band, supplying the test signal together with a local signal output from a local signal generator to a mixer, and converting the test signal into a millimeter-wave band signal, wherein the signal generation device changes a frequency of the local signal in accordance with a test target frequency for testing a device under test (DUT) and transmitting a signal subjected to frequency conversion by the frequency conversion unit as a test signal of the device under test, the waveguide filter device according to claim 6 is used for the filter, and the waveguide portion of the waveguide filter device inputs the mixing output from the signal generation unit, allows a frequency band corresponding to a pass band of the waveguide bandpass filter to pass through, and suppresses a higher-order mode occurring in a high frequency band of twice or more than a cutoff frequency by the higher-order mode suppressor.

10. A higher-order mode suppression control method using the higher-order mode suppressor according to claim 1, the higher-order mode suppression control method comprising:

a step of respectively connecting the first waveguide and the second waveguide to the opposite side end surface of the first ridge-waveguide conversion unit and the opposite side end surface of the second ridge-waveguide conversion unit, which are disposed on both sides of the ridge waveguide portion;

a step of inputting a frequency band exceeding a basic frequency band from the input side; and a step of causing the ridge waveguide portion to perform an operation of suppressing a higher-order mode by the waveguide path having a ridge structure with respect to the input frequency band.

11. A filter configuration method in the waveguide filter device according to claim 6, wherein the first coaxial waveguide converter is connected to the one end of the waveguide portion, the second coaxial waveguide converter is connected to the other end of the waveguide portion, in the waveguide portion, the first ridge-waveguide conversion unit, the ridge waveguide portion, and the second ridge-waveguide conversion unit, which are elements of the higher-order mode suppressor, are sequentially disposed in the longitudinal direction, between a side of the first coaxial waveguide converter and a side of the second coaxial waveguide converter, and the waveguide bandpass filter is disposed on a side opposite to the ridge waveguide portion of at least one of the first ridge-waveguide conversion unit and the second ridge-waveguide conversion unit.

12. The waveguide filter device according to claim 5, wherein a waveguide conforming to a predetermined waveguide standard is connected as the first waveguide and the second waveguide, and the ridge waveguide portion is configured with dimensions such that the inner diameter of the waveguide path suppresses a TE20 mode up to a desired frequency.

* * * * *